United States Patent
Furry

(10) Patent No.: US 6,869,286 B2
(45) Date of Patent: Mar. 22, 2005

(54) LANGUAGE LEARNING SYSTEM

(76) Inventor: Michael E. Furry, 15175-D SW. Walker Rd., Beaverton, OR (US) 97006

( * ) Notice: Subject to any disclaimer, the term of this patent is extended or adjusted under 35 U.S.C. 154(b) by 0 days.

(21) Appl. No.: 09/820,081

(22) Filed: Mar. 28, 2001

(65) Prior Publication Data

US 2002/0142270 A1 Oct. 3, 2002

Related U.S. Application Data

(60) Provisional application No. 60/210,818, filed on Jun. 9, 2000.

(51) Int. Cl.[7] .................. G09B 19/00; G09B 17/00; G09B 19/04
(52) U.S. Cl. .................. 434/167; 434/156; 434/159; 434/171; 434/172; 434/174; 434/178; 434/185
(58) Field of Search ............... 434/156–185, 434/404, 172, 171, 174, 393, 402

(56) References Cited

U.S. PATENT DOCUMENTS

| | | | |
|---|---|---|---|
| 270,511 A | | 1/1883 | Thomson |
| 465,834 A | | 12/1891 | Clarkson |
| 557,307 A | * | 3/1896 | Foster ............... 434/172 |
| 1,024,195 A | * | 4/1912 | Gothberg ............ 434/404 |
| 1,378,893 A | * | 5/1921 | Newell .............. 434/402 |
| 1,671,758 A | | 5/1928 | Appley |
| 2,437,090 A | | 3/1948 | Gold |
| 2,483,833 A | * | 10/1949 | Levin ............... 273/157 R |
| 3,248,809 A | | 5/1966 | Stifano |
| 3,407,514 A | * | 10/1968 | Christian ............ 434/174 |
| 3,460,273 A | | 8/1969 | Boyd |
| 3,574,957 A | * | 4/1971 | Bello-Bridick |
| 3,593,433 A | * | 7/1971 | Dillon et al. ........ 434/178 |
| 3,665,618 A | * | 5/1972 | Hahn ............... 273/270 |
| 3,762,071 A | | 10/1973 | Coffman et al. |
| 4,007,548 A | | 2/1977 | Cytanovich |
| 4,158,921 A | * | 6/1979 | Stolpen ............. 273/146 |
| 4,389,193 A | | 6/1983 | Phillips |
| 4,643,680 A | | 2/1987 | Hill |
| 4,776,802 A | * | 10/1988 | Rind et al. ......... 273/157 R |
| 4,778,392 A | * | 10/1988 | Mitchell ............ 206/509 |
| 5,466,010 A | * | 11/1995 | Spooner ............ 283/67 |
| 5,799,267 A | * | 8/1998 | Siegel .............. 434/156 |
| 5,823,782 A | * | 10/1998 | Marcus et al. ....... 434/156 |
| 5,863,043 A | * | 1/1999 | Bitner ............... 273/299 |
| 5,906,492 A | * | 5/1999 | Putterman .......... 434/169 |

* cited by examiner

*Primary Examiner*—Derris H. Banks
*Assistant Examiner*—Dmitry Suhol

(57) ABSTRACT

A language learning system is provided. The language learning system typically includes a set of fictional characters, each character being associated with a predetermined phoneme of a language, such as English. The character typically has a given name including the phoneme. The system may further include a learning device configured to display at least one of the characters along with an associated letter corresponding to the phoneme. The device may be a wheel, block, vessel, card, doll, disk, cone, or other suitable device.

17 Claims, 23 Drawing Sheets

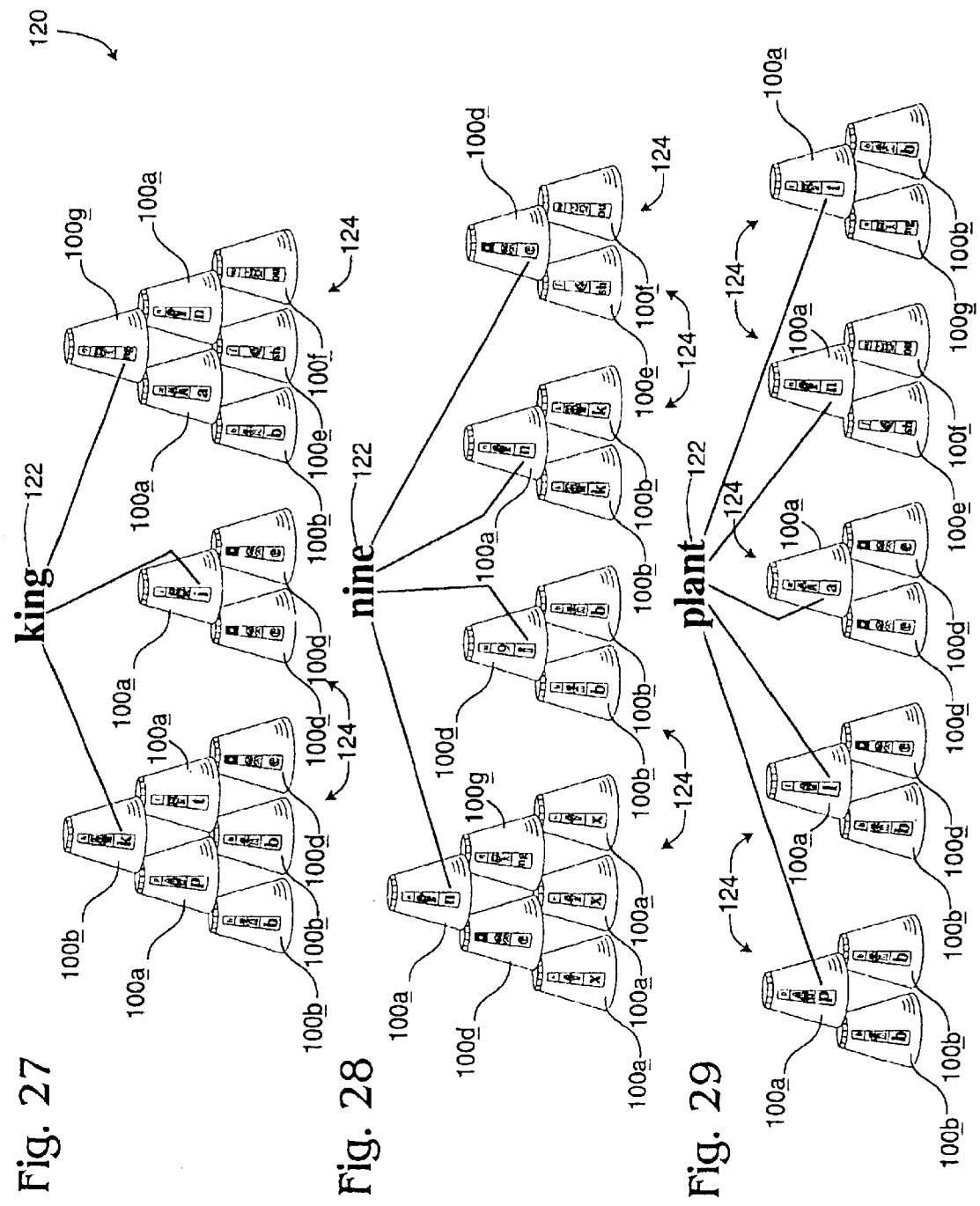

Fig. 30

Wheel 1

| Letter(s) | Character Name | Pronunciation Symbol |
|---|---|---|
| a | ant | æ |
| e | elf | e |
| f | fox | f |
| g | gus | g |
| i | imp | i |
| l | lug | l |
| m | mop | m |
| n | nut | n |
| o | ots | ɑ |
| p | pen | p |
| s | sox | s |
| t | ten | t |
| u | ump | ʌ |
| x | xxx | ks |

Fig. 31

Wheel 2

| Letter(s) | Character Name | Pronunciation Symbol |
|---|---|---|
| b | bat | b |
| c | cat | k |
| d | dog | d |
| h | hat | h |
| j | jet | dʒ |
| k | kid | k |
| qu | quiz | kw |
| r | red | r |
| v | van | v |
| w | wig | w |
| y | yum | j |
| z | zip | z |

Fig. 32

Wheel 3

| Letter(s) | Character Name | Pronunciation Symbol |
|---|---|---|
| silent e | no sound | -- |
| o | bone | ou |
| s | dogs | z |
| u | June | u: |
| y | fly | ai |
| a | Japan | ə |
| a | ball | ɔ: |
| o | two | u: |
| e | zebra | i: |
| u | bull | u |
| y | kitty | i |
| o | son | ʌ |
| a | snake | ei |
| c | cent | s |
| g | giant | dʒ |
| i | nine | ai |

Fig. 33

Wheel 4

| Letter(s) | Character Name | Pronunciation Symbol |
|---|---|---|
| sh | fish | ʃ |
| oo | spoon | u: |
| ow | cow | au |
| ea | dream | i: |
| wh | whale | hw |
| ea | head | e |
| oo | book | u |
| ow | snow | ou |
| ck | neck | k |
| er | paper | ə:r |
| ee | tree | i: |
| or | fork | ɔ:r |

Fig. 34

Wheel 5

| Letter(s) | Character Name | Pronunciation Symbol |
|---|---|---|
| ou | mouse | au |
| oy | boy | ɔi |
| ch | check | tʃ |
| ie | tie | ai |
| ar | car | a:r |
| wr | wrist | r |
| th | that | ð |
| ou | soup | u: |
| ch | chord | k |
| ai | rain | ei |
| ui | fruit | u: |
| au | sauce | ɔ: |
| th | three | θ |
| ir | girl | ə:r |

Fig. 35

Wheel 6

| Letter(s) | Character Name | Pronunciation Symbol |
|---|---|---|
| ng | king | ŋ |
| aw | claw | ɔ: |
| igh | night | ai |
| wor | worm | wə:r |
| kn | knife | n |
| ew | new | u: |
| dge | edge | dʒ |
| oa | boat | ou |
| ur | turn | ə:r |
| tch | watch | tʃ |
| ey | key | i: |
| ay | May | ei |
| ph | phone | f |
| oi | coin | ɔi |

Fig. 36

WORD LIST 1

Words and character names that can be spelled using the letter(s) 46 and associated phonemes of the first subset of set 11, of wheel 1

| | | | | | | | | | |
|---|---|---|---|---|---|---|---|---|---|
| 1 ant | 11 flag | 21 gum | 31 lost | 41 mix | 51 ots | 61 plant | 71 slam | 81 split | 91 ten |
| 2 egg | 12 flax | 22 gus | 32 lug | 42 mom | 52 ox | 62 plum | 72 slap | 82 spot | 92 tent |
| 3 elf | 13 fog | 23 ill | 33 lump | 43 mop | 53 pan | 63 plus | 73 slim | 83 stamp | 93 test |
| 4 elm | 14 fox | 24 imp | 34 man | 44 moss | 54 pants | 64 pop | 74 slip | 84 stem | 94 tilt |
| 5 fan | 15 fun | 25 lamp | 35 map | 45 mug | 55 pass | 65 pot | 75 smell | 85 step | 95 tip |
| 6 fast | 16 gas | 26 last | 36 mat | 46 nest | 56 pen | 66 pump | 76 snap | 86 stop | 96 top |
| 7 fat | 17 gift | 27 leg | 37 melt | 47 net | 57 pest | 67 putt | 77 sox | 87 sun | 97 trip |
| 8 fig | 18 glass | 28 lift | 38 mess | 48 nut | 58 pet | 68 sap | 78 spell | 88 tag | 98 tug |
| 9 film | 19 golf | 29 lip | 39 mint | 49 off | 59 pig | 69 sit | 79 spill | 89 tan | 99 ump |
| 10 fin | 20 gull | 30 log | 40 miss | 50 on | 60 pin | 70 six | 80 spin | 90 tap | 100 up |

Fig. 37

WORD LIST 2

Words and character names that can be spelled using the letter(s) 46 and associated phonemes of the first and second subset of set 11, of wheel 2

| | | | | | | | | | |
|---|---|---|---|---|---|---|---|---|---|
| 1 bad | 11 big | 21 clam | 31 dad | 41 frog | 51 hop | 61 mad | 71 raft | 81 skin | 91 vest |
| 2 bag | 12 box | 22 clap | 32 desk | 42 frost | 52 hops | 62 milk | 72 rag | 82 skip | 92 web |
| 3 band | 13 bud | 23 class | 33 dig | 43 grab | 53 hot | 63 mud | 73 ram | 83 sled | 93 wet |
| 4 bank | 14 bug | 24 club | 34 dog | 44 grass | 54 hug | 64 pad | 74 red | 84 skunk | 94 wig |
| 5 bass | 15 bump | 25 cod | 35 doll | 45 hand | 55 ink | 65 pink | 75 rod | 85 stand | 95 win |
| 6 bat | 16 bus | 26 comic | 36 dress | 46 hat | 56 jet | 66 pod | 76 rub | 86 swim | 96 wind |
| 7 bed | 17 buzz | 27 crab | 37 drink | 47 help | 57 jump | 67 pond | 77 run | 87 tub | 97 yell |
| 8 bell | 18 can | 28 cub | 38 drop | 48 hen | 58 kid | 68 print | 78 sad | 88 twig | 98 yak |
| 9 belt | 19 cap | 29 cup | 39 drum | 49 hill | 59 kiss | 69 quit | 79 sand | 89 twist | 99 yum |
| 10 bend | 20 cat | 30 cut | 40 dust | 50 hit | 60 lid | 70 quiz | 80 scrub | 90 van | 100 zip |

LANGUAGE LEARNING SYSTEM

CROSS REFERENCE TO RELATED APPLICATIONS

This application claims priority under 35 U.S.C. § 119(e) to U.S. Provisional Patent Application No. 60/210,818 entitled "Language Learning Device and System," filed Jun. 9, 2000, the disclosure of which is herein incorporated by reference.

TECHNICAL FIELD

The present invention generally relates to systems for learning languages, and more particularly to such systems that utilize characters and character names to teach a user the pronunciation of the language.

BACKGROUND

Learning to speak and read a language is challenging both for children and adults alike. Young children learning their native language for the first time often encounter difficulty mastering the pronunciation of certain letters. In addition, many young children have difficultly combining the letters to pronounce entire words and phrases. Slow language development can have detrimental effects on a child's social development and academic performance.

For older children and adults, learning a second language also presents challenges. The sounds of individual letters in the second language may be strange or foreign to the learner, making the them difficult to pronounce. In addition, even if the learner is able to pronounce individual letters, the learner may have difficulty remembering the pronunciations and combining them to pronounce an entire word. The learner may eventually become frustrated by slow progress, and give up study of the second language.

Therefore, it would be desirable to provide a language learning system to assist the user in associating letters with corresponding pronunciations in a manner that is both enjoyable and effective in teaching the language.

SUMMARY OF THE INVENTION

A language learning system is provided. The language learning system may take several forms. For example, according to one aspect of the invention, the language learning system may include a set of fictional characters, each character being associated with a predetermined phoneme of a language, such as English. The character typically has a given name including the phoneme. The system may further include a learning device configured to display at least one of the characters along with an associated letter corresponding to the phoneme. The device may be a wheel, block, vessel, card, doll, disk, cone, computer, or other suitable device.

According to another aspect of the invention, the language learning system may include a body and a plurality of phoneme selectors coupled to the body. Each phoneme selector typically includes a letter, character, and pronunciation symbol for each of a plurality of phonemes. Each of the characters typically has a name that includes the phoneme. The system also typically includes a target window positioned in the body. The target window is configured to display a target. The plurality of selectors are configured to be adjustable by a user to spell a word associated with the target. The selectors may be wheel-shaped. The body may be trolley-shaped.

The language learning system may also include (a) at least one character having at least one letter disposed thereon, and (b) the character having a name starting with the letter on the character. Typically the character is positioned on the surface of an object selected from the group consisting of a wheel, block, vessel, card, doll, object of revolution, such as a cone and computerized device.

According to another aspect of the invention, a language learning system is provided which includes (a) at least one substrate, (b) at least one character disposed on said substrate and having a name which begins with at least one letter of an alphabet of a language, and (c) at least one pronunciation symbol of the language disposed on said substrate which corresponds to the pronunciation of the at least one letter of the alphabet of the language which begins said name of said character.

According to another aspect of the invention, a language learning system is provided, which includes (a) at least one substrate, (b) at least one character disposed on said substrate and having a name formed of one or more letters of an alphabet of a language, (c) at least one letter of the alphabet of the language disposed on said substrate and being the same as one or more of the letters of the alphabet of the language forming said name of said character, and (d) at least one pronunciation symbol of the language disposed on said substrate which corresponds to the pronunciation of said at least one letter of the alphabet of the language of said system.

According to another aspect of the invention, a language learning system is provided, which includes a body and a set of fictional characters. Each character is associated with a predetermined phoneme of a language, and has a given name including the phoneme. The system further includes a phoneme selector coupled to the body. The phoneme selector includes the set of characters, each character being positioned in a character region along with an associated pronunciation symbol and letter. The system further includes a selection pane positioned in the body. The selection pane is configured to show a selected letter of the phoneme selector. The system further includes a target window positioned in the body. The target window is configured to display a target. The plurality of selectors are configured to be adjustable by the user by a user to spell a name of the target using selected letters in the selection panes.

BRIEF DESCRIPTION OF THE DRAWINGS

FIG. 27 is a perspective view of a language learning according to another embodiment of the present invention, including stackable cones similar to the cones of FIG. 24, stacked to spell the word KING.

FIG. 28 is a perspective view showing the stackable cone language learning system of FIG. 27 in another orientation spelling the word NINE.

FIG. 29 is a perspective view showing the stackable cone language learning system of FIG. 27 in another orientation spelling the word PLANT.

FIG. 30 is a table listing the letters, character names, and pronunciation symbols for Wheel 1, shown in FIG. 3.

FIG. 31 is a table listing the letters, character names, and pronunciation symbols for Wheel 2, shown in FIG. 4.

FIG. 32 is a table listing the letters, character names, and pronunciation symbols for Wheel 3, shown in FIG. 6.

FIG. 33 is a table listing the letters, character names, and pronunciation symbols for Wheel 4, shown in FIG. 7.

FIG. 34 is a table listing the letters, character names, and pronunciation symbols for Wheel 5, shown in FIG. 8.

FIG. 35 is a table listing the letters, character names, and pronunciation symbols for Wheel 6, shown in FIG. 9.

FIG. 36 is a list of exemplary words that can be spelled using Wheel 1, shown in FIG. 3.

FIG. 37 is a list of exemplary words that can be spelled using Wheel 2, shown in FIG. 4.

DETAILED DESCRIPTION OF THE INVENTION

Figure 1:
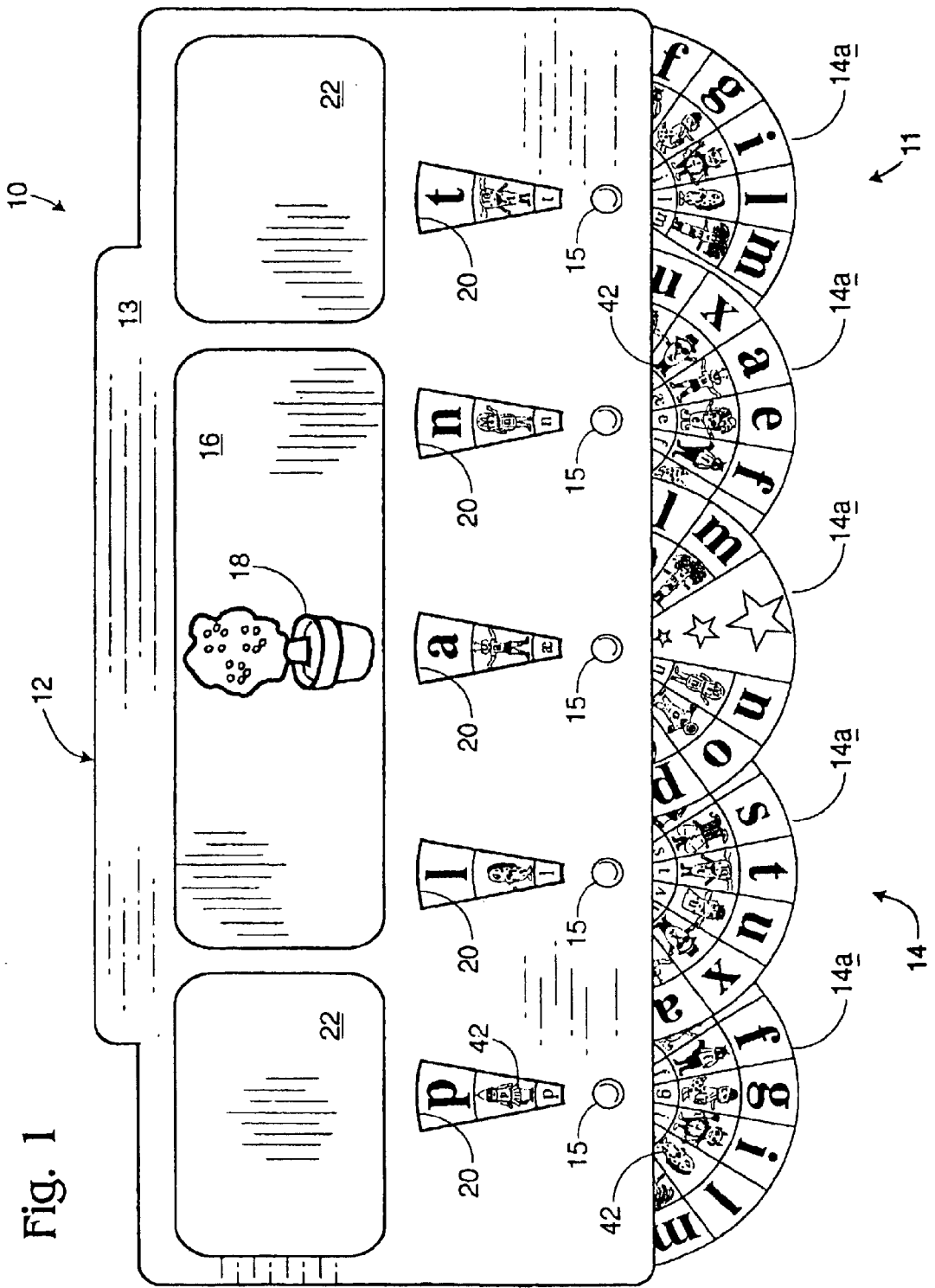
FIG. 1 is a front view of a language learning system according to one embodiment of the present invention, including a learning device formed in the shape of a trolley.

Referring initially to FIG. 1, a language learning system according to one embodiment of the present invention is shown generally at 10. Language learning system 10 includes a set 11 of fictional characters 42, shown in FIGS. 16–17, and an associated learning device 12. Each of the characters 42 is associated with a predetermined phoneme of a language, and has a given name 48, which includes the phoneme. By learning the character's name 48, a user may become familiar with a correct pronunciation of the associated letter. Learning device 12 is configured to display each of the characters, as well as a pronunciation symbol and letter associated with each character. Users may practice spelling and sounding out words using learning device 12, to eventually gain mastery of the language.

Typically, learning device 12 includes a body 13 in a trolley-shaped form, as shown in FIG. 1. Alternatively, the learning device may be formed in the shape of a block, vessel, card, doll, computer device, wheel, or object of revolution such as a cone, as described below. A plurality of wheel-shaped selectors 14 are typically coupled to body 13 by fasteners 15, which are typically rivets or pins. Typically, the fasteners 15 are removable such that the selectors can be removed and reattached. Alternatively, the selectors may be slid in and out of the body. Body 13 includes a target window 16 in which a target 18 icon or word is presented to a user. The target may be printed on a sheet of material that slides under target window 16, such as a removable insert or rolling sheet of paper. The user responds by attempting to spell the name of the target 18 by arranging wheel-shaped selectors 14 such that the appropriate letters appear in selection panes 20. In the illustrated embodiment, target 18 is a plant, and P-L-A-N-T is spelled out in selection panes 20. Learning device 12 may also include auxiliary windows 22 configured to display other information such as elapsed time, hints, cumulative score, a next and a previous target, etc., to the user.

Typically, learning device 12 includes five wheel-shaped selectors 14, as shown. Alternatively, learning device 12 may include one, two, or a greater number of wheel-shaped selectors 14. Selectors 14 are typically arranged in a horizontal row, such that the letters that are visible through selector panes 20 line up horizontally. Alternatively, selectors 14 and associated selector panes 20 may be arranged vertically, diagonally, or in a curved orientation. The selector panes 20 may also be fixedly or adjustably sized to show only the letters 46, characters 42 and/or pronunciation symbols 40. The wheel-shaped selectors 14 shown in FIG. 1 are typically selectors 14*a*, illustrated in detail in FIG. 3, described below. Alternatively, any of the selectors 14*b*–14*g* shown in FIGS. 4–9 may be used as one or more of selectors 14 on system 10. In addition, it will be appreciated that while selectors 14 are typically wheel-shaped, other suitable shapes of selectors may also be employed such as a cone or cylinder.

Typically, learning device 12 is constructed of substrates made of thin laminated paper material, which is inexpensive to manufacture in large quantities. Alternatively, learning device 12 may be constructed of plastic or metal materials. While learning device 12 is shown in FIG. 1 in the shape of a trolley for exemplary purposes, it will be appreciated that virtually any other suitable shape may be employed.

Figure 2:
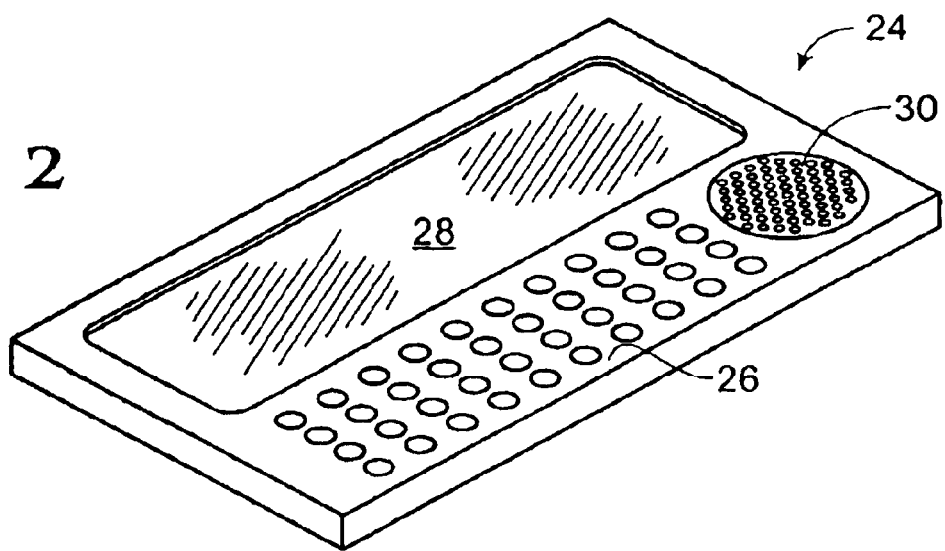
FIG. 2 is an isometric view of a computerized learning device for use with a language learning system according to another embodiment of the present invention.

In FIG. 2, a computerized learning device according to another embodiment of the present invention is shown generally at 24. Computerized learning device 24 typically includes a user input device 26 such as a keyboard, display 28, speaker 30, and a microphone. Display 28, user input device 26, and speaker 30 are linked via a bus and suitable interfaces to hardware such as a central processing unit (CPU) and associated memory. The memory and CPU are configured to execute software necessary for displaying a language learning interface similar in appearance to the trolley of FIG. 1. The software is also typically configured to pronounce a selected letter, phoneme, or word appearing on display 28 and/or to display a picture representing the word.

It will be appreciated that while computerized learning device 24 typically displays a trolley such as shown in FIG. 1, many variations are also possible. For example, only a relevant portion of each of selectors 14 may be displayed, rather than displaying the selector in its entirety. In addition, the software also may be configured to drill a user by sequentially displaying the characters, pictures, letters, and pronunciation symbols discussed below, and/or by pronouncing phonemes associated with these symbols via speaker 30. In addition, computerized learning device 24 may include software configured to display visual representations of the various other embodiments of the present invention, including the blocks 50, vessels 54, cards 60, dolls 64, cones **\*\*, and wheels \*\*** described below. The software may also be configured with voice recognition capability, such that the device may "listen" to the user pronounce a word or phoneme, and give appropriate feedback to the user regarding correct pronunciation.

The system 24 may be configured to speak a target word to a user, in response to which the user may attempt to form the word using graphically represented phoneme selectors 14. In addition, the computerized learning device may include a digital timer configured to time the user forming the word. It will be appreciated that system 24 may be configured to communicate with a remote server via a computer network such as the Internet, and words, characters, or other information may be downloaded from a central server for display on computerized language learning system 24.

Figure 3:
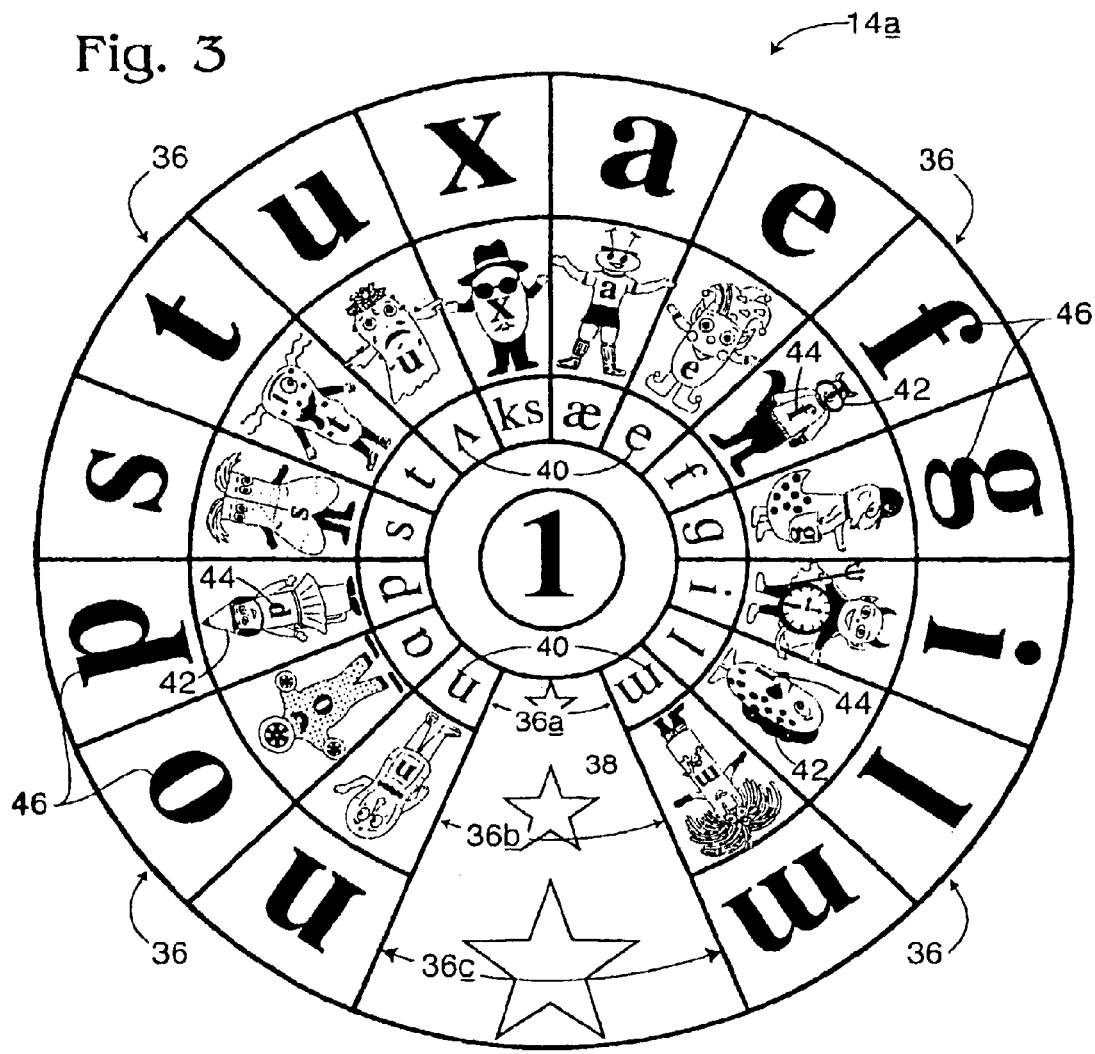
FIG. 3 is a front view of one embodiment of a wheel for use in the language learning system of FIG. 1, including letters, characters, and pronunciation symbols associated with a first set of 14 phonemes.
Figure 4:
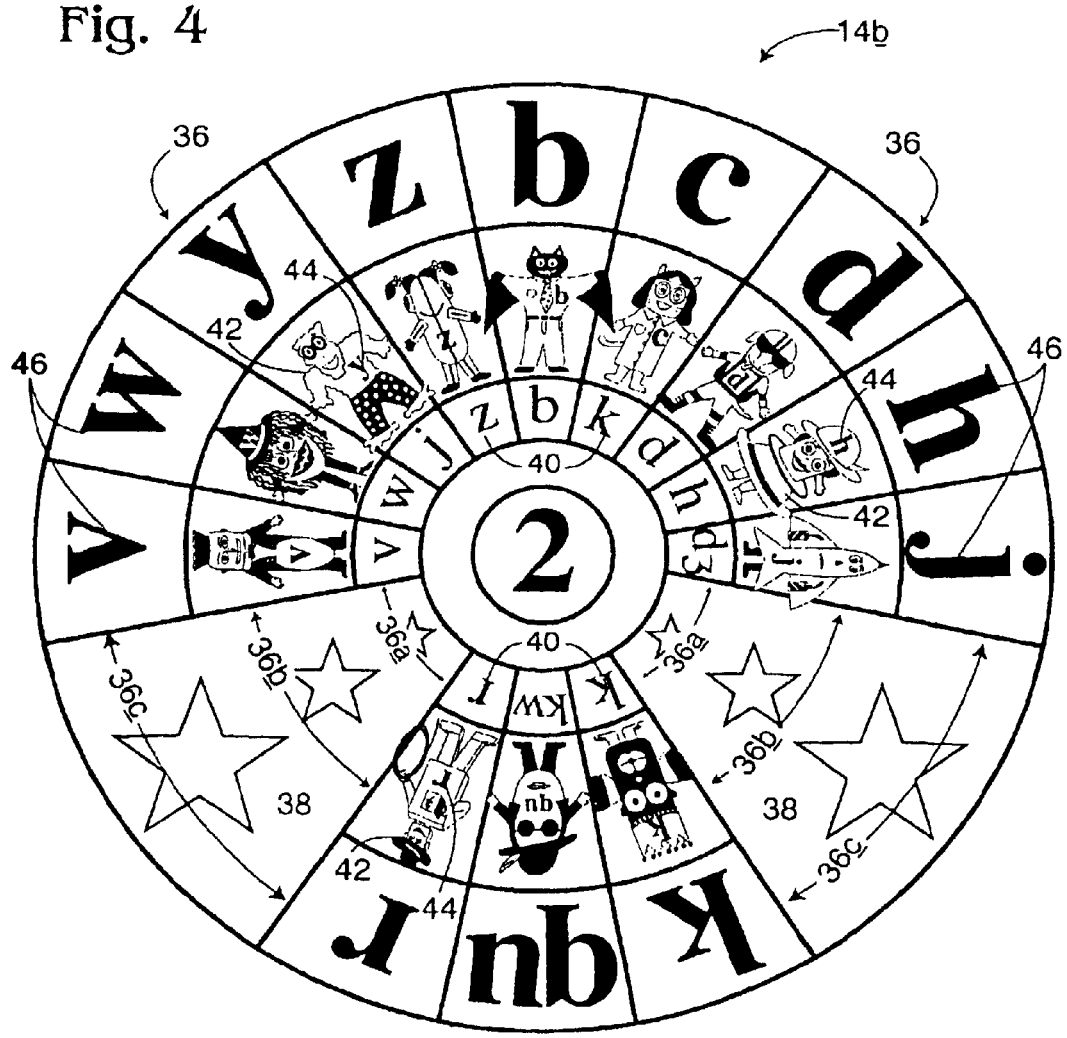
FIG. 4 is a front view of another embodiment of a wheel for use in the language learning system of FIG. 1, including letters, characters, and pronunciation symbols associated with a second set of 12 phonemes.
Figure 5:
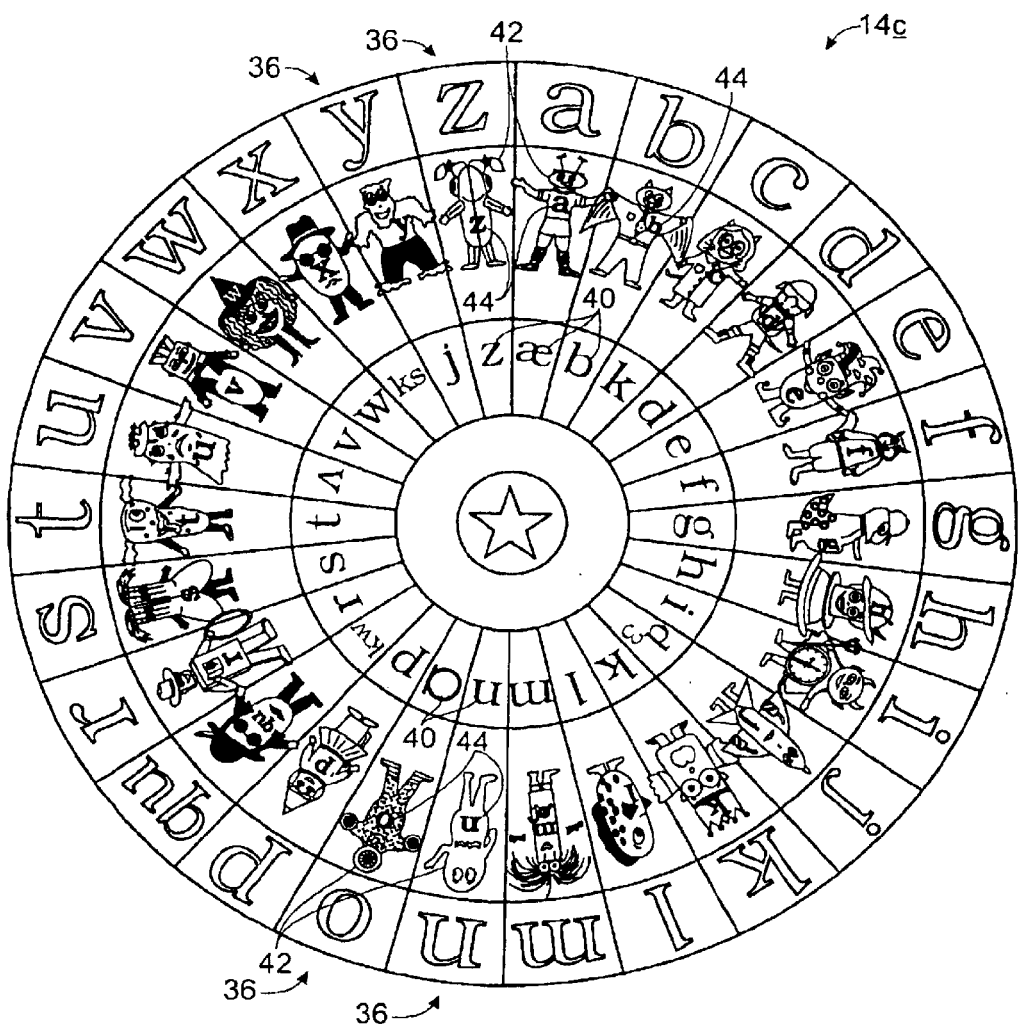
FIG. 5 is a front view of yet another embodiment of a wheel for use in the language learning system of FIG. 1, including letters or letter combinations, characters, and pronunciation symbols associated with the 26 phonemes featured in the wheels of FIGS. 3 and 4.
Figure 6:
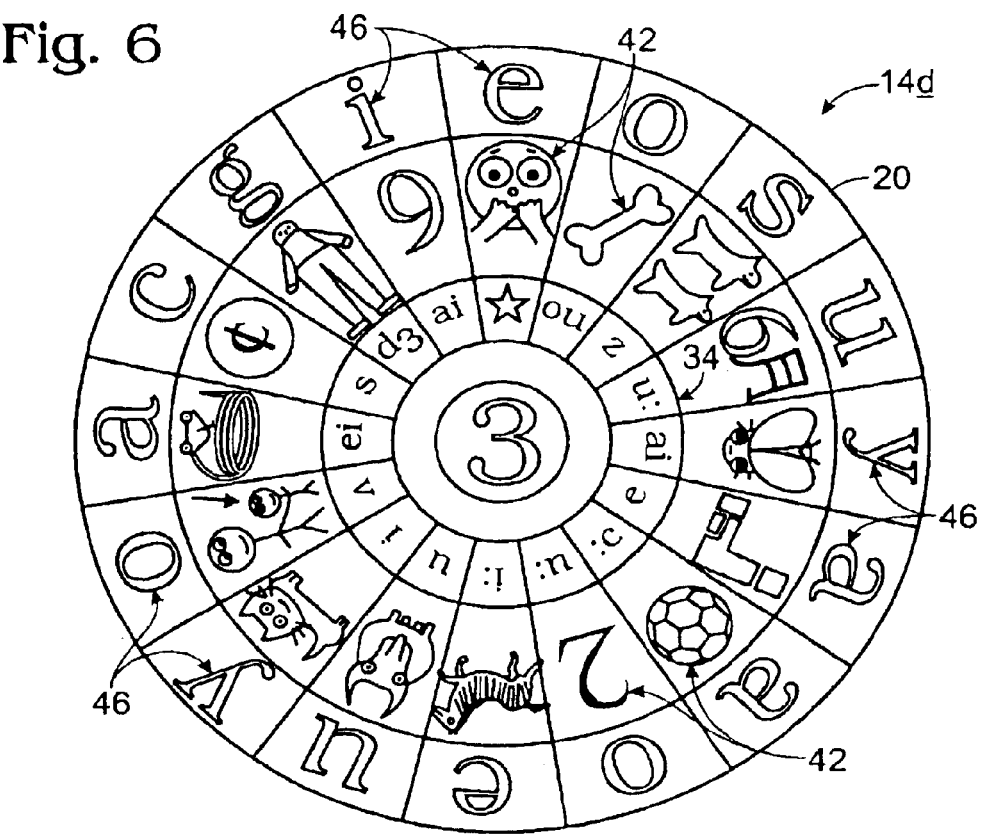
FIG. 6 is a front view of yet another embodiment of a wheel for use in the language learning system of FIG. 1, including letters, characters, and pronunciation symbols associated with a third set of 16 phonemes.
Figure 7:
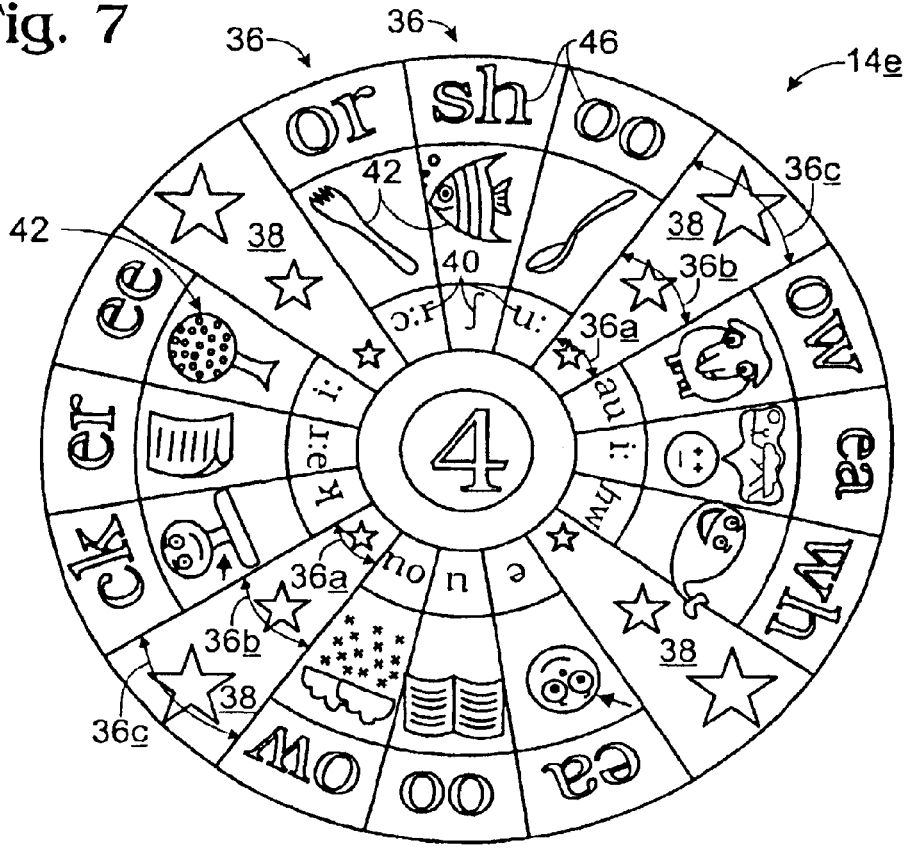
FIG. 7 is a front view of yet another embodiment of a wheel for use in the language learning system of FIG. 1, including letters, characters, and pronunciation symbols associated with a fourth set of 12 phonemes.
Figure 8:
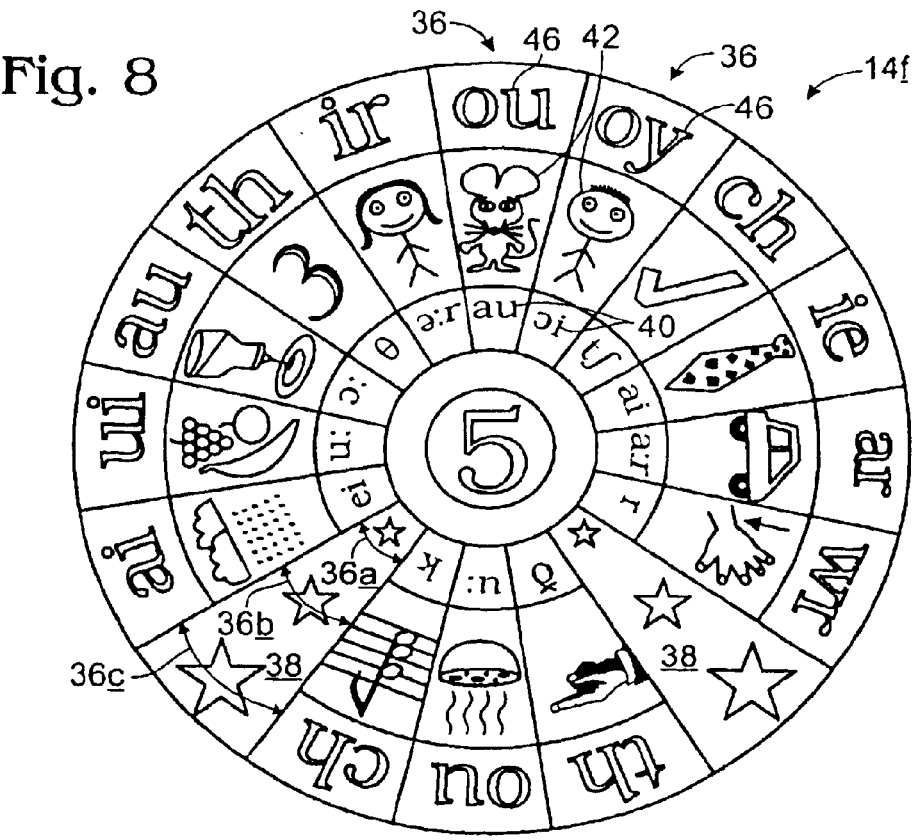
FIG. 8 is a front view of yet another embodiment of a wheel for use in the language learning system of FIG. 1, including letters, characters, and pronunciation symbols associated with a fifth set of 14 phonemes.
Figure 9:
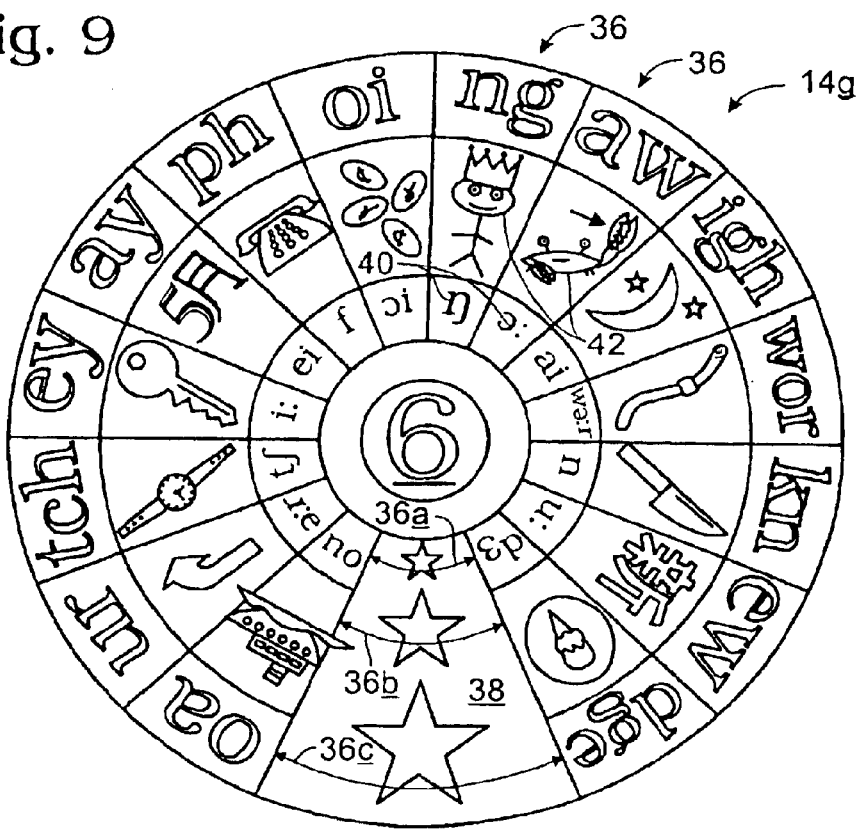
FIG. 9 is a front view of yet another embodiment of a wheel for use in the language learning system of FIG. 1, including letters, characters, and pronunciation symbols associated with a sixth set of 14 phonemes.

In FIGS. 3–9 various embodiments of wheel-shaped selectors according to the present invention are shown. Wheels 1–2 in FIGS. 3–4 collectively contain all 26 letters of the English alphabet, while the wheel of FIG. 5 is a combination of the wheels 1 and 2 and includes all 26 letters of the English alphabet, although it will be understood that "u" appears on Wheel 1, and in the combination "qu" on Wheel 2. It will be appreciated that for each letter of the English language, a plurality of pronunciations exist, such as the long and short sounds for each vowel, etc. Wheels 1–2 contain a single pronunciation for each letter of the English alphabet. Wheels 3–6 in FIGS. 6–9 contain various additional pronunciations for the many letters depicted thereon. The sets of phonemes on the wheels are designed to be studied progressively by the user. Thus, a student who has mastered Wheel 1 will be able to pronounce any word containing the phonemes of Wheel 1, and a student who has mastered Wheels 1–4 will be able to pronounce any word containing the phonemes of Wheels 1–4. FIGS. 30–35 list the letters, character names, and pronunciation symbols on each of Wheels 1–6, respectively. FIGS. 36–37 show exemplary words that can be spelled using the letters of and associated phonemes of Wheel 1 and 2, respectively.

Turning now to FIG. 3, a wheel-shaped selector referred to as Wheel 1 is shown generally at 14*a*. Wheel 1 typically includes plurality of radially extending character regions 36 and one or more blank regions 38. Alternatively, blank region 38 may not be included. Character regions 36 typically include concentric circular or ring-shaped sectors 36*a*, 36*b*, and 36*c*, respectively containing a pronunciation symbol 40, a character 42 featuring a letter or letter combination 44 positioned therein, and a letter or letter combination 46, all associated with a predetermined phoneme of a language. Letter or letter combinations 44 and 46 may be hereinafter referred to as letter(s) 44, 46. Letter(s) 44, 46 may be a single letter, such as "a" or "b", or may be multiple letters, such as "qu."

It will be appreciated that the positions of the letter(s) 46 and pronunciation symbols 40 may be flipped, such that the letter(s) 46 are positioned in ring-shaped sector 36*a*, and pronunciation symbols 40 are positioned in ring-shaped sector 36*c*. Various other arrangements of the letter(s) 46, characters 42, and pronunciation symbols 40 are possible. It will also be appreciated that while lower case letters are shown, upper case letters, or a combination of upper and lower case letters may also be used. Typically, the language taught by language learning system 10 is English, although other languages may also be taught using the present invention.

Figure 16:
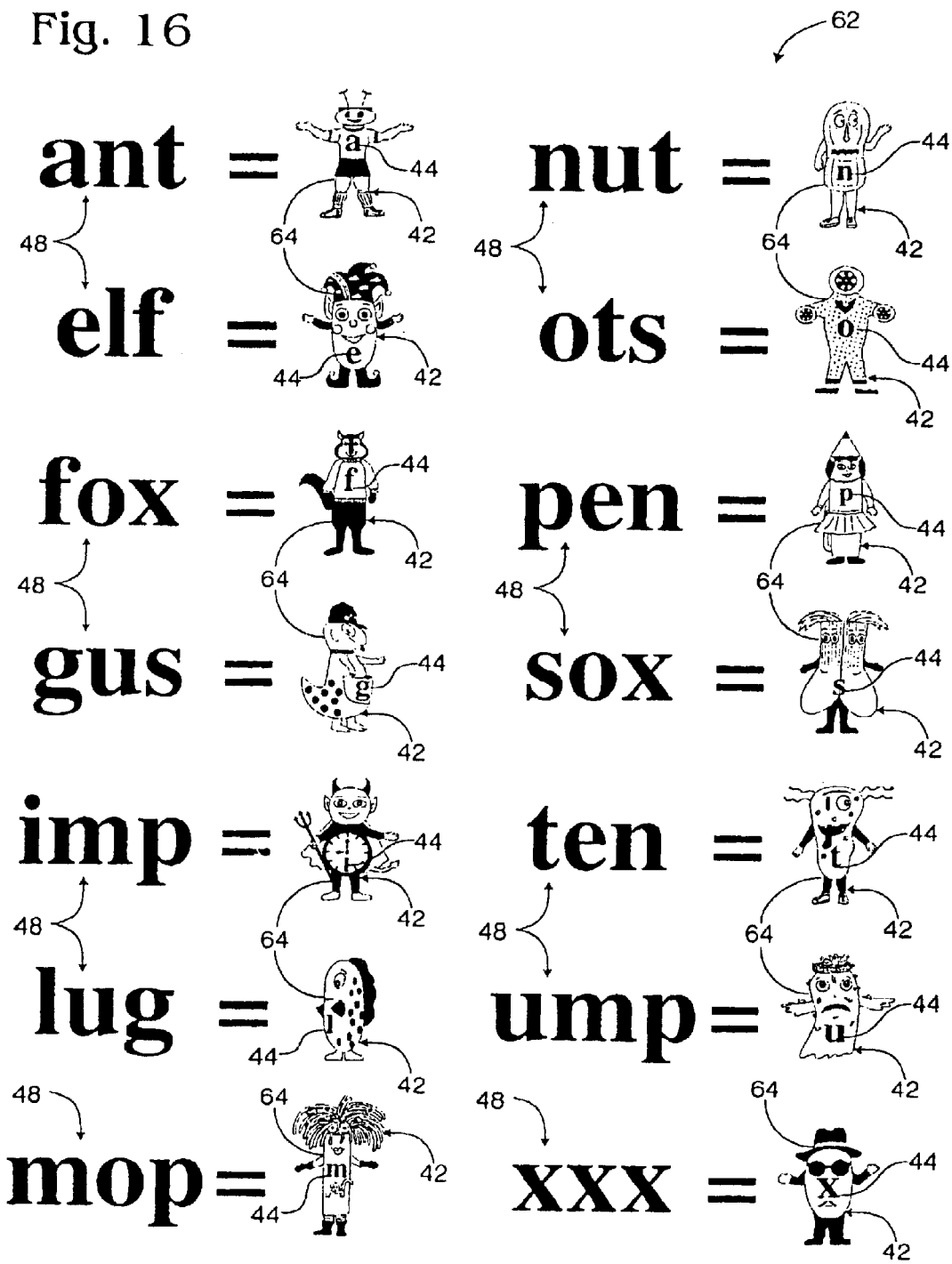
FIG. 16 is a front view of a language learning system according to another embodiment of the present invention including a learning device in the form of a plurality of dolls resembling characters, the dolls shown being those characters featured on the wheel of FIG. 3.
Figure 17:
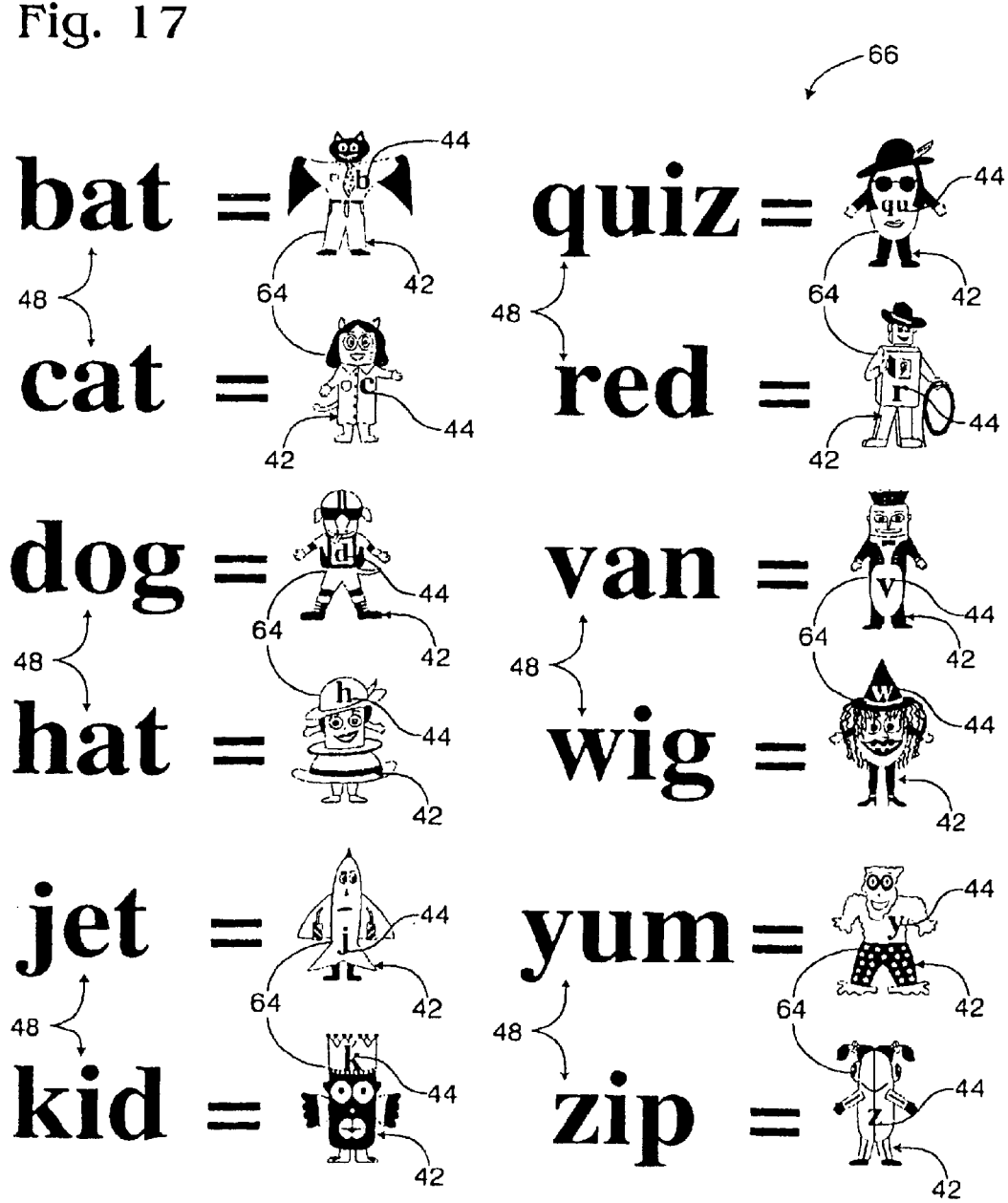
FIG. 17 is a front view of additional dolls of the system of FIG. 16, the dolls resembling the characters found on the wheel of FIG. 4.

As used herein, the term "character" refers to a creature or figure, often but not necessarily drawn in cartoon-style, which has a given name. Each character typically has an associated name 48, as shown in FIGS. 16 and 17. For the wheels 14*a*–14*b* shown in FIGS. 3–5, the name 48 of each character begins with the associated letter(s) 46. Alternatively, the name 48 of each character 42 may include the letter(s) 46 at another location within the name, such as in the middle of the name or at the end of the name, as is the case with certain characters in the wheel-shaped selectors shown in FIGS. 6–9, described below.

Set 11 of characters 42, and associated letter(s) 46 and pronunciation symbols 40, is typically divided into six predetermined subsets, corresponding to Wheels 1–6. Wheel 1 contains the first predetermined set of letters, characters, pronunciation symbols, and associated phonemes of the language. The six subsets progressively become more difficult. Thus, the user of system 10 typically learns the names of the first predetermined subset of characters before moving on to more advanced subsets of set 11.

Turning now to FIG. 4, a wheel-shaped selector referred to as Wheel 2 is shown generally at 14*b*. Wheel 2 includes a second predetermined subset of pronunciation symbols 40, characters 42, and letter(s) 46 associated with particular phonemes. FIG. 5 illustrates a wheel shaped selector 14*c* having all 26 letters of the English alphabet printed thereon, and includes all of the characters and pronunciation symbols from Wheels 1 and 2. The names 48 of the characters 42 featured on selectors 14a–14c are illustrated in FIGS. 16 and 17, and listed in FIGS. 30–31.

FIGS. 6–9 show additional embodiments of wheel-shaped selectors generally indicated at 14d–14g, and referred to as Wheels 3–6. A third through sixth predetermined subset of pronunciation symbols, characters, and letters appear on Wheels 3–6, respectively. Where a single letter appears multiple times on a wheel or within Set 11, as does "a" in Wheel 3, the letters may be differently colored to further distinguish the pronunciation of the letters. The third through sixth subsets of pronunciation symbols, characters, and letters on Wheels 3–6 are listed in FIGS. 32–35. It will also be understood that Wheels 1–6 collectively formed a language learning system, and may be used independently from Body 12.

Figure 10:
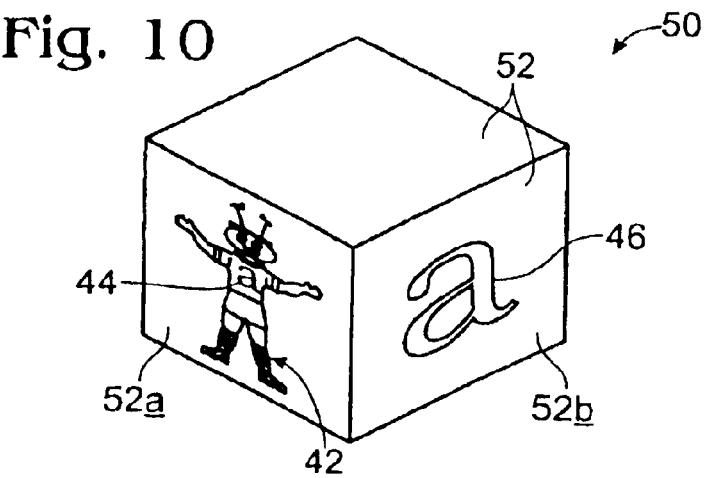
FIG. 10 is a perspective view of a learning device for use with a language learning system according to another embodiment of the present invention, the learning device including a block having a character and a letter positioned thereon.
Figure 11:
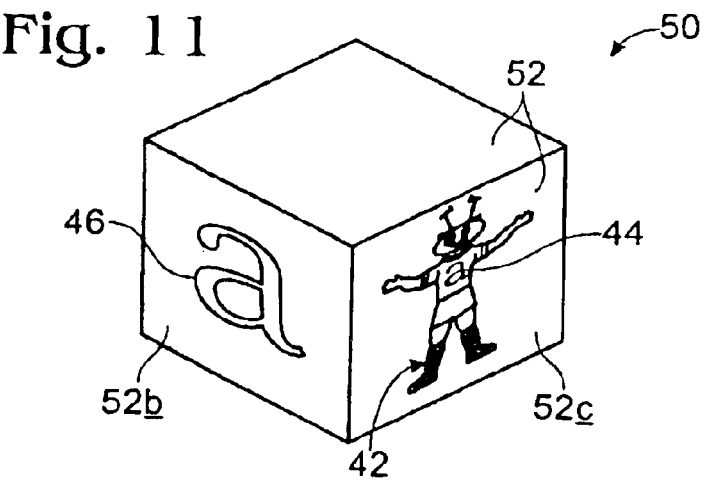
FIG. 11 is a perspective view of the block shown in FIG. 10 rotated 90 degrees.

In FIGS. 10–11, another embodiment of a learning device according to the present invention is shown generally at 50. Learning device 50 typically is formed in the shape of a block 50. Blocks 50 are typically provided in a set, each block of the set having one of characters 42 printed thereon. The set of blocks may be divided into subsets corresponding to the predetermined sets of characters found on each of Wheels 1–6. Collectively, the set of blocks forms a language learning system.

Figure 12:
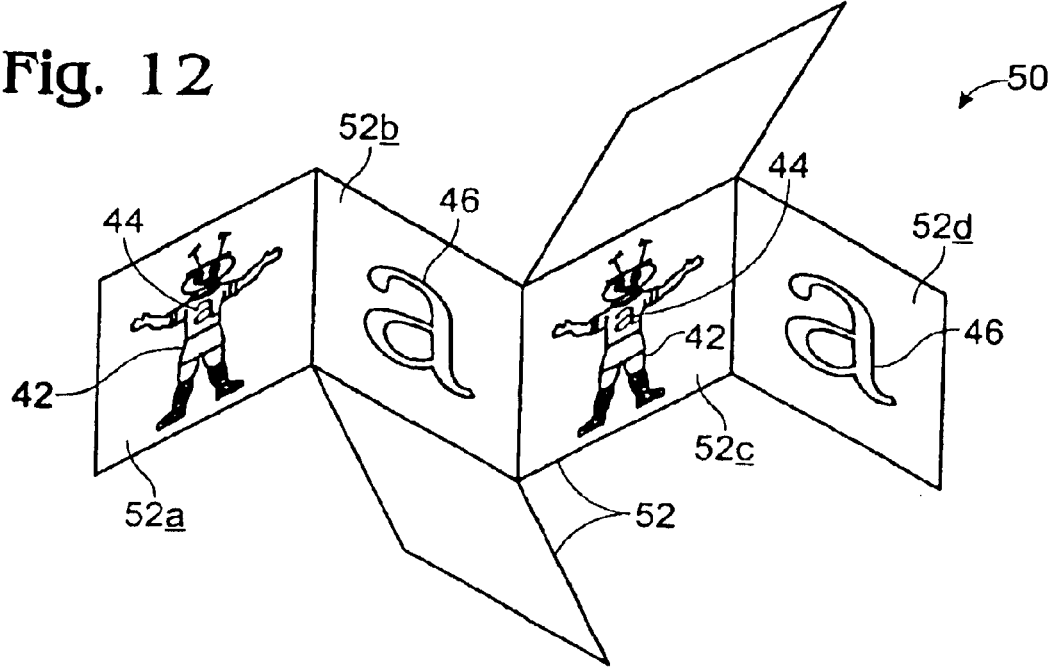
FIG. 12 is a layout view of the block shown in FIGS. 10 and 11, showing two of the same characters and two of the same letters on the block.

Block 50 typically includes a plurality of sides 52 formed at right angles to each other. Alternatively, another shape of block with another predetermined number and orientation of sides may be used. A character 42 and letter(s) 46 are typically positioned on adjacent sides 52a and 52b of block 50. FIG. 11 illustrates block 50 rotated 90 degrees from the orientation shown in FIG. 10, thereby revealing that character 42 also appears on side 52c, opposite side 52a. FIG. 12 shows sides 52 of block 50 unfolded. Character 42 appears on sides 52a, 52c, and letter 46 appears on sides 52b, 52d.

Alternatively, it will be appreciated that character 42 and letter(s) 46, and/or pronunciation symbol 40 may appear on a different combination of sides of block 50. In addition, the character 42, letter(s) 46, and/or pronunciation symbol 40 may appear on the same side of block 50. The blocks are typically used by children as a combination toy and memory reinforcement tool. As children play with the blocks, they gradually become familiar with the characters printed thereon and the pronunciation of the letter associated with the character. To spell a word, a child may line up a series of blocks in a row. The child may sound out the word, making reference to the characters printed adjacent the letters. The blocks may also be attachable and stackable, as described below.

Figure 19:
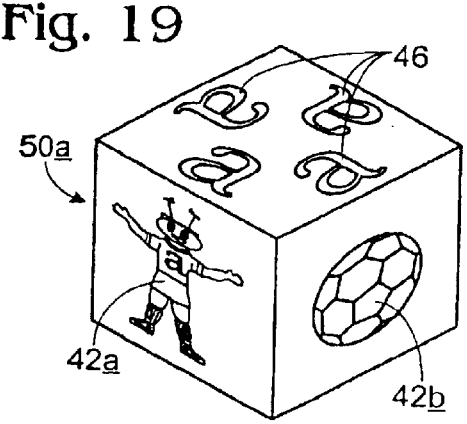
FIG. 19 is a perspective view of another embodiment of a block according to the present invention.

FIG. 19 shows another embodiment of a block 50a according to the present invention, having a plurality of characters depicted thereon, including a first character 42a (named "ant") and a second character 42b (named "ball"), representing different pronunciations of a single letter. Typically the characters are arranged on separate side faces, adjacent a corresponding letter on a top and/or bottom face of the block 50a. It will be understood that a cover may be provided to hid one or more surfaces of block 50a, such that the user cannot see letter 46, character 42a, and/or ball 42b. This is useful as a memorization aid, to test the user's recall.

Figure 13:
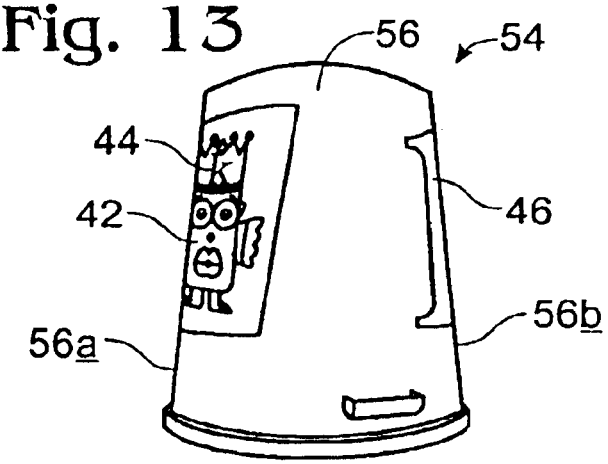
FIG. 13 is a side view of a learning device for use with a language learning system according to another embodiment of the present invention, the learning device including a vessel having a character and a letter positioned thereon.
Figure 14:
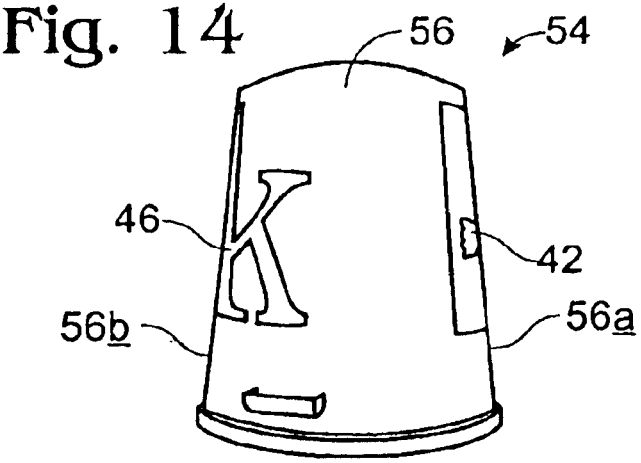
FIG. 14 is a side view of the vessel shown in FIG. 13 rotated 180 degrees.

In FIGS. 13–14, a learning device according to another embodiment of the present invention is shown generally at 54, in the form of an inverted vessel 54. Like blocks 50, vessels 54 typically are provided in sets, such that each vessel in the set contains a unique character 42 of the set of characters 11. Collectively, the set of vessels and associated characters form a language learning system.

Vessel 54 may be a cup, bowl, waste receptacle, or virtually any other form of suitable vessel. Although Vessel 54 is shown inverted, it may be positioned in other orientations. The vessel includes an outer surface 56 having oppositely facing surface regions 56a, 56b, each with a corresponding letter 46 and character 44 disposed thereon. The depicted embodiment is an inverted waste receptacle, which, because of its large size and easy visibility, may be used to teach the character names and letter pronunciations to a large group of individuals. Like the blocks 50 described above, vessels 54 are also typically arranged in six predetermined sets, corresponding to the sets of phonemes found on Wheels 1–6.

Figure 15:
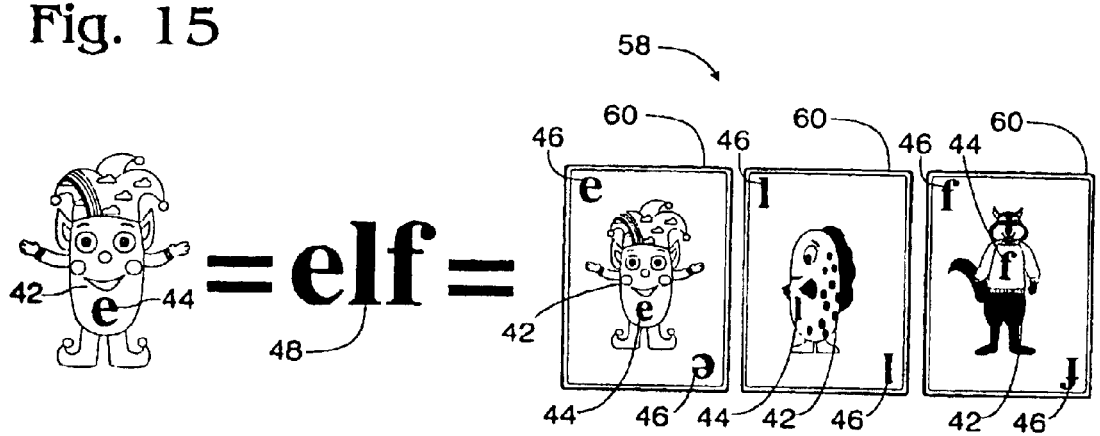
FIG. 15 is a front view of a language learning system according to another embodiment of the present invention including a learning device in the form of a plurality of cards, the cards being shown in an arrangement spelling a character's name.

FIG. 15 illustrates a language learning system according to another embodiment of the invention, formed in the shape of a set 58 of cards 60. Each of cards 60 typically includes letter(s) 46 and a character 42 having a letter 44 from the character name 48 depicted thereon. Set 58 typically includes the characters and letters found on Wheel 1, described above. Additional sets of cards 60 may also be provided which feature the characters and letters found on Wheels 2–6 described above. The cards may be positioned in a row to form a word, such as the character name 48 "ELF," as shown. One card may contain all of the characters in a subset and be used as a "wild card." "Wild" blocks, vessels, and dolls featuring multiple characters may also be provided.

Figure 20:
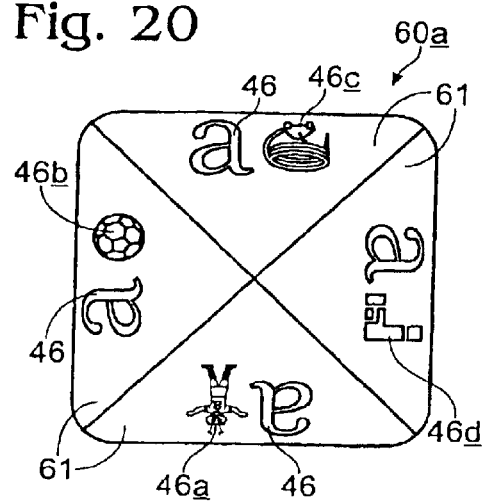
FIG. 20 is a perspective view of another embodiment of a card according to the present invention.

Cards 60 typically include letter(s) 46 positioned in two corners of the card, and character 42 positioned in the center of the card. Alternatively, the character may be positioned in the corners of the card, and the letter(s) in the center of the card. FIG. 20 shows another embodiment of a card 60a. Card 60a is divided into a plurality of character regions 61, each containing a unique character representing a different pronunciation of a letter 46. These letters may be differently colored to further distinguish the pronunciation of the letters. Card 60 and/or 60a also may include pronunciation symbols associated with each of the characters. Card 60a, like block 50a is used to teach various pronunciations of a single letter to the language learner. In addition, it will also be appreciated that a single card may contain different letters 46 that have the same associated pronunciation symbol 40, such that a plurality of different letters are included on a single card, each of the letters having the same pronunciation. The various cards 60 in a set also may be numbered sequentially for easy reference. While the cards are shown with lowercase letters, it will be appreciated that uppercase letters may also be used. Pronunciation symbols 40 may also be included on the cards.

FIGS. 16 and 17 show a learning device according to another embodiment of the present invention, in the form of a set of character dolls 64 resembling characters 42. The set of dolls 64 is divided into a first subset 62, corresponding to the characters found on Wheel 1, and a second subset 66, corresponding to the characters found on Wheel 2. Collectively, the dolls form another embodiment of a language learning system according to the present invention.

The name 48 of each of characters 42 of Wheels 1 and 2 typically begins with the letter(s) 44 positioned on the body of the doll 64. As explained above, the characters 42 of Wheels 3–6 include corresponding letter(s) 46 somewhere in each character's name 48, but name 48 may not begin with the letter(s) 46.

It will be appreciated that the various depicted embodiments of the present invention include letters 46, characters 42, and/or pronunciation symbols 40 positioned on a surface of an underlying substrate. In learning device 12 (including selectors 14a–14g), the surface is typically a laminated paper surface. Alternatively, it will be appreciated that a surface of another material, such as plastic, may be used. In learning device 24, the surface is typically a computer display 28, such as an flat panel or CRT display. In learning device 50, the surface is typically a laminated paper or plastic sheet. Alternatively, learning device 50 may be made of wood, metal, or solid plastic. In learning device 54, the surface is typically plastic, although metal or other suitable material may also be used. For learning device 60, the surface is typically a paper or cardboard surface, although plastic may also be used. The substrate of learning devices 12, 50, 54, 60, and dolls 64 also generally may be referred to as a "body" of each device.

Figure 18:
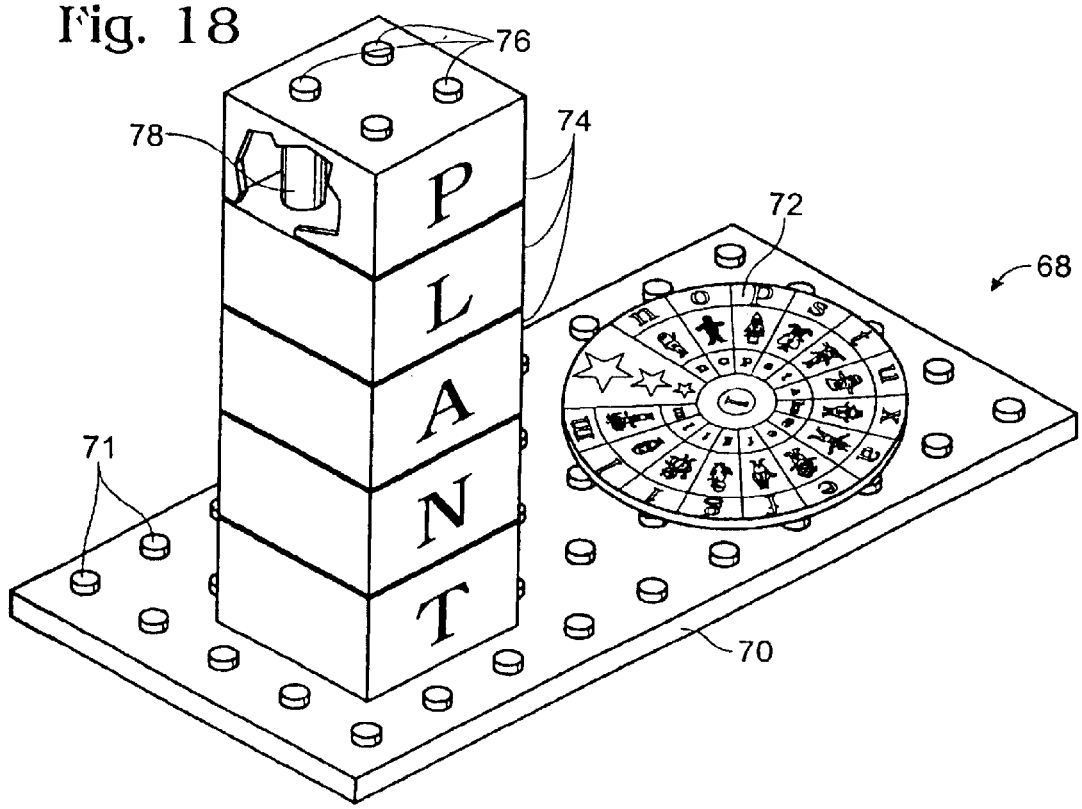
FIG. 18 is a perspective view of a language learning system according to another embodiment of the present invention, including stackable blocks and wheels.

In FIG. 18, a language learning system according to another embodiment of the invention is shown generally at 68. Language learning system 68 typically includes a substrate 70 configured to attach to blocks 74 and/or one or more wheel shaped selectors 72. Wheel shaped selectors 72 are typically similar in appearance to selectors 14 previously described, and include an understructure configured to releasably mate with the projections 71 of substrate 70. Alternatively, wheel-shaped selectors 72 may include a lip configured to releasably mate with projections 71. Although blocks 74 are pictured only with letters for simplicity, it will be appreciated that blocks 74 typically include characters 42, and have an appearance similar to blocks 50 described above. Blocks 74 also include projections 76 and corresponding voids formed in hollow tubes 78, which are configured to mate in order to allow the blocks to be stacked. The user may stack the blocks, as shown, or position them alongside each other to form a word, as shown.

Figure 21:
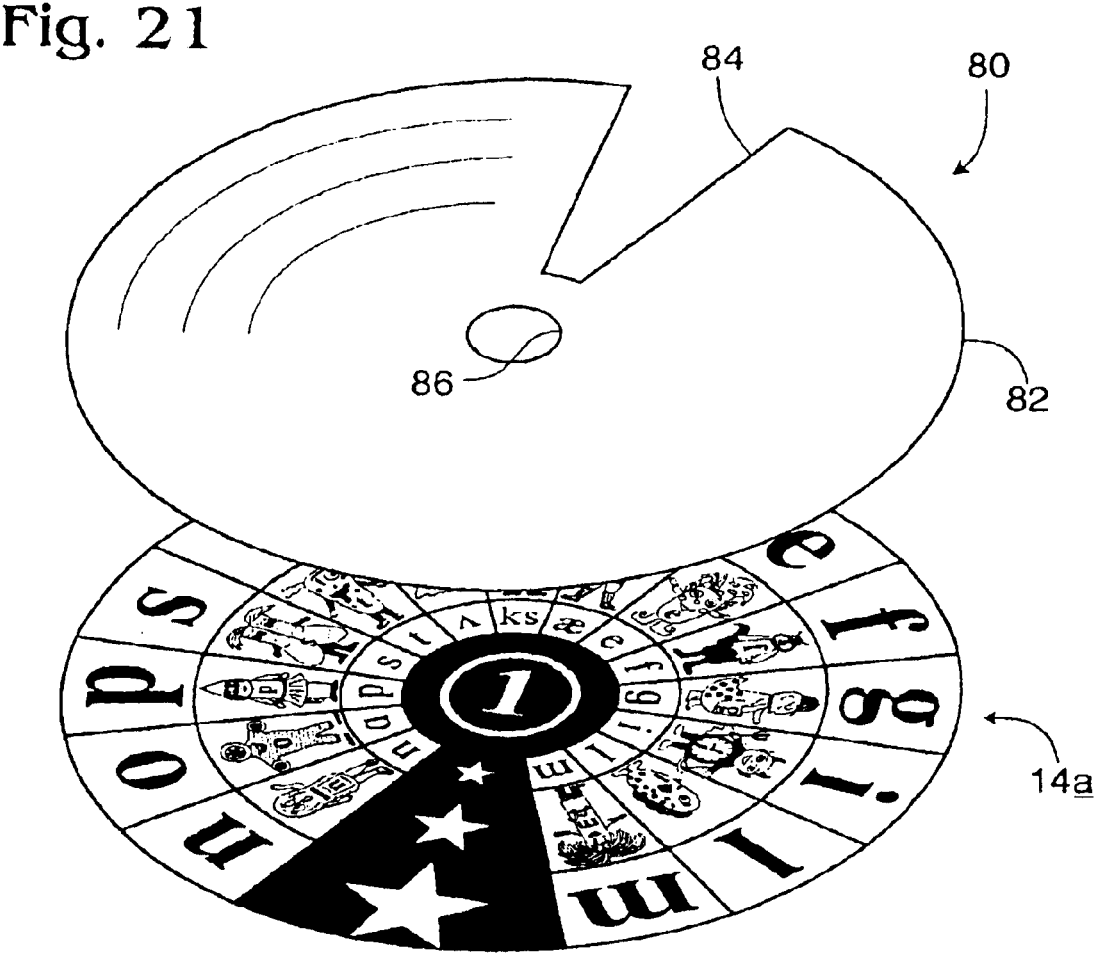
FIG. 21 is an exploded perspective view of a language learning system according to another embodiment of the present invention, in the form of a disk.
Figure 22:
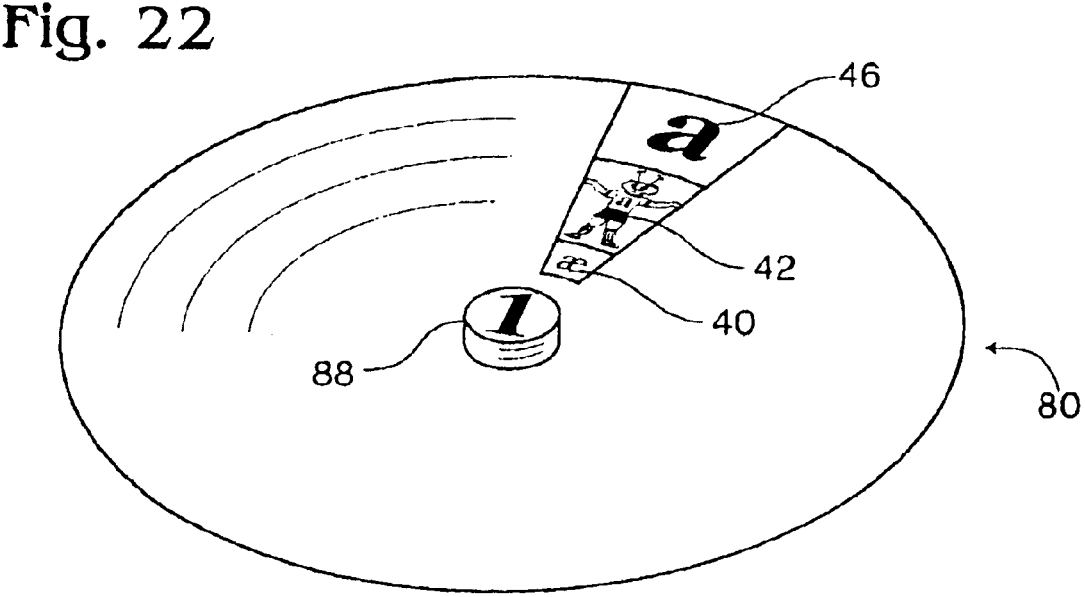
FIG. 22 is a perspective view of the disk of FIG. 21, in an assembled orientation.

FIG. 21 shows another embodiment of a disk-shaped selector 80 (or simply disk 80) for use in a language learning system according to the present invention. Disk-shaped selector 80 typically includes a wheel having letters, characters, and pronunciation symbols, such as wheel 14a described above, and a cover 82. Cover 82 includes a selection pane or opening 84 typically sized to enable a user to view one letter 46, character 42, and pronunciation symbol 40 at a time on selector 14a. Cover 82 also includes a hole 86 through which a knob or fastener 88 may be placed to secure the cover to the underlying selector, as shown in FIG. 22. Once secured, the selector may be rotated relative to the cover 82 to enable a user to view different letters, characters, and pronunciation symbols through selection opening 84.

Figure 23:
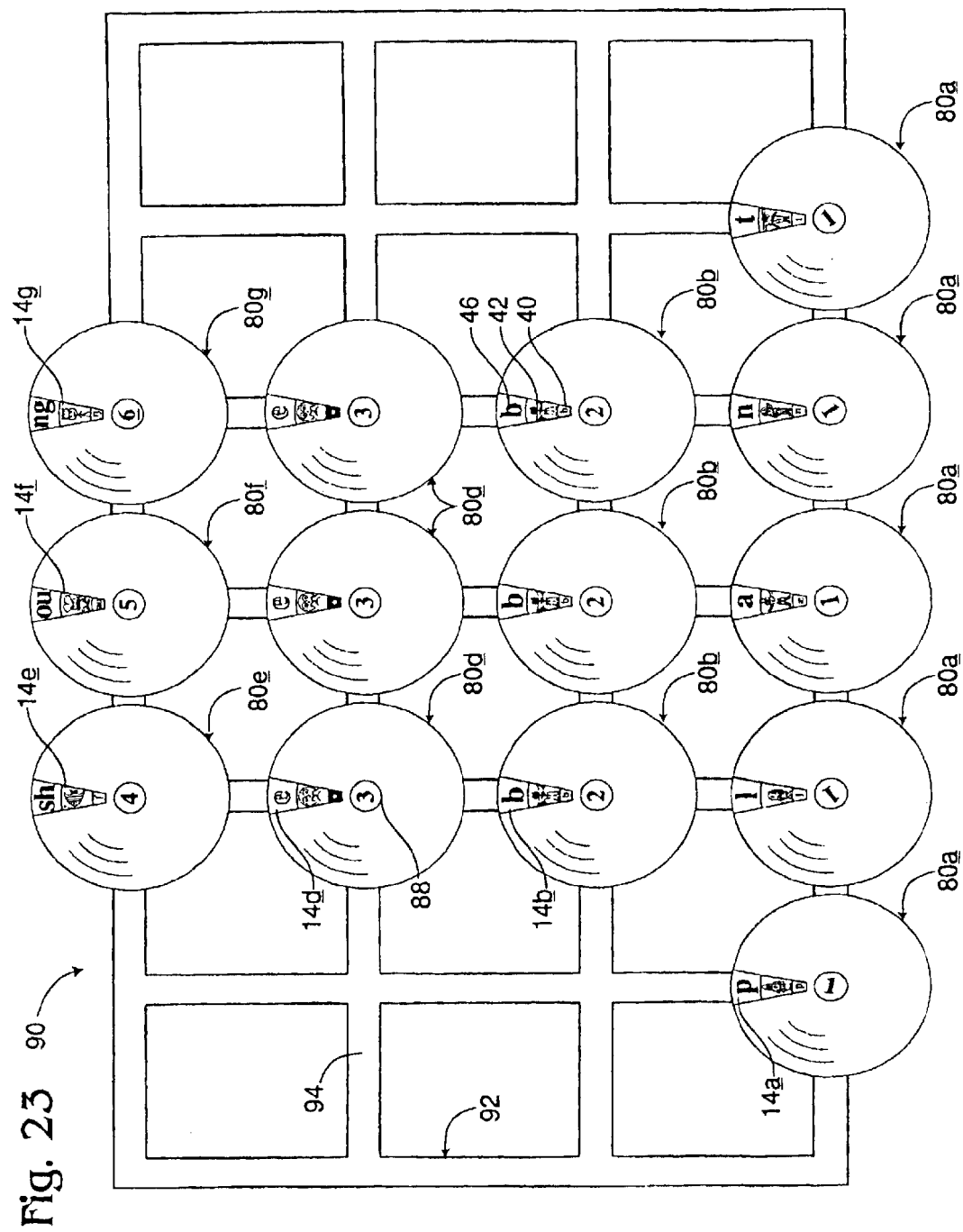
FIG. 23 is a top view of a language learning system according to another embodiment of the present invention, having slidable disks positioned in tracks.

FIG. 23 shows a language learning system according to another embodiment of the invention generally indicated at 90. Language learning system 90 typically includes a framework 92 of tracks 94 within which disk-shaped selectors 80a–80e may be slid by a user. Disk-shaped selectors 80a–80e are similar to disk-shaped selector 80 shown in FIGS. 21–22, and have wheels corresponding to Wheels 1–6, described above. The user typically slides the disk-shaped selectors around as necessary to form a word on a row of framework 92. For example, the word PLANT is shown spelled across the bottom row of framework 92.

Figure 24:
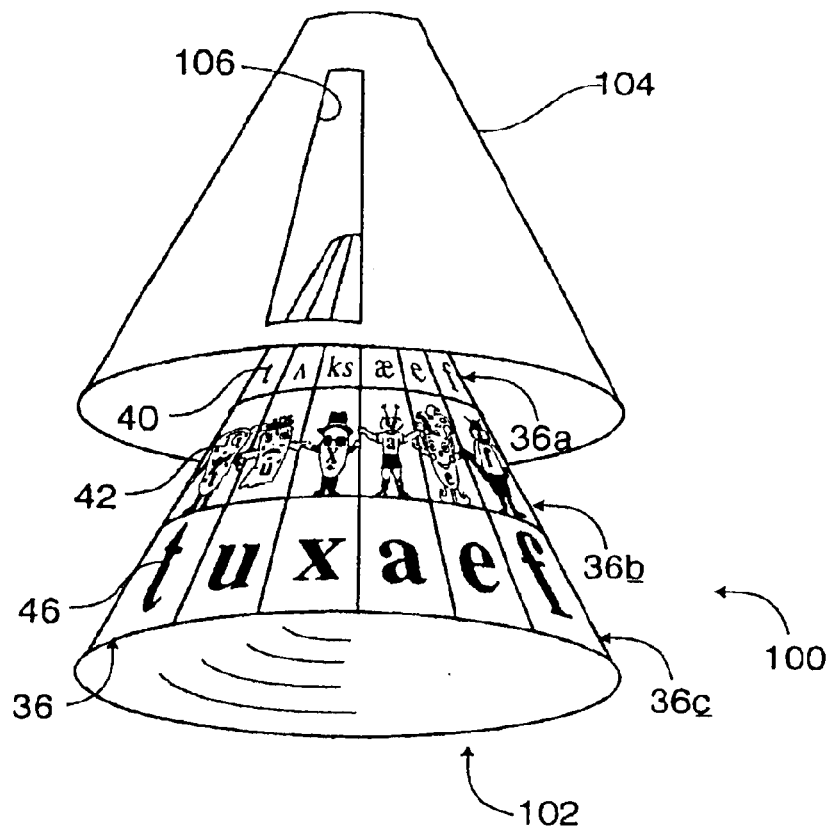
FIG. 24 is an exploded perspective view of a language learning system according to another embodiment of the invention, in the form of a cone.
Figure 25:
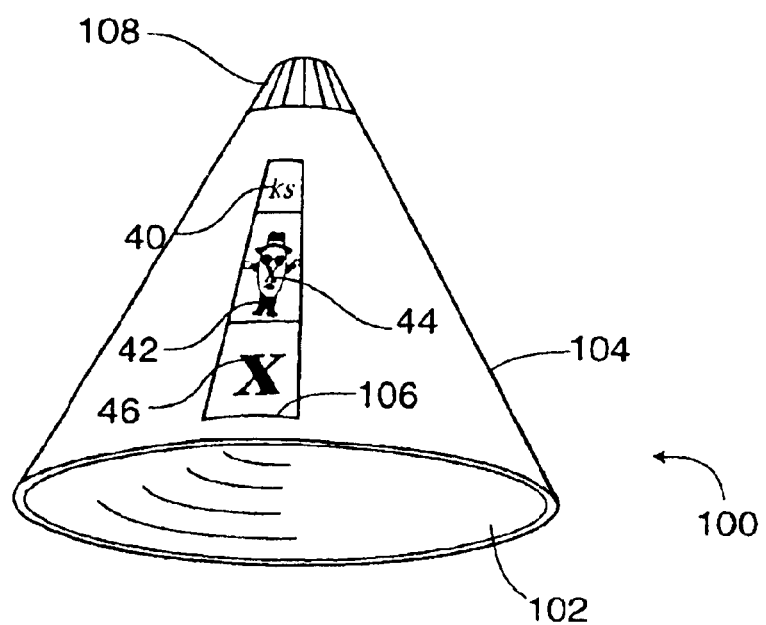
FIG. 25 is an assembled view of the cone-shaped language learning system of FIG. 24.

FIG. 24 shows a cone shaped selector 100 for use in another embodiment of a language learning system according to the present invention. Cone-shaped selector 100 typically includes a lower cone 102 having the same letters, characters, and pronunciation symbols as wheel 14a, described above. Cone-shaped selector 102 also has a cone-shaped cover 104 having an selection pane or opening 106 formed therein. As shown in FIG. 25, the cone shaped selector also typically includes a knob or fastener 108 configured to enable a user to turn the lower cone 102 relative to the cover 104. As the user turns the knob, the user can selective position a column of associated letters 46, characters 42, and pronunciation symbols 40 with the selection pane or opening 106.

Figure 26:
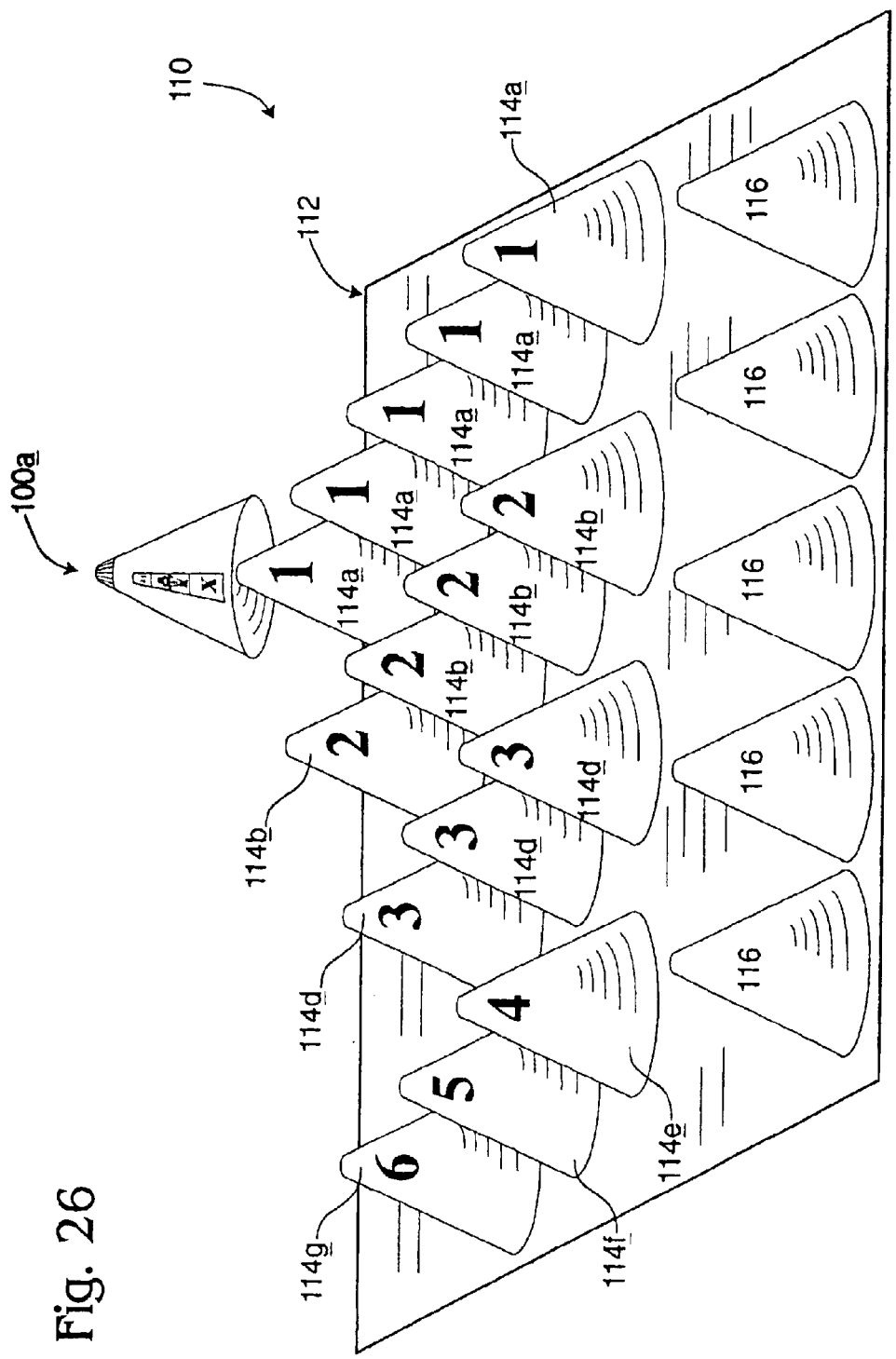
FIG. 26 is an isometric view of a language learning system according to another embodiment of the invention, including a board and one or more of the cone shaped devices of FIGS. 24 and 25.
Figure 38:
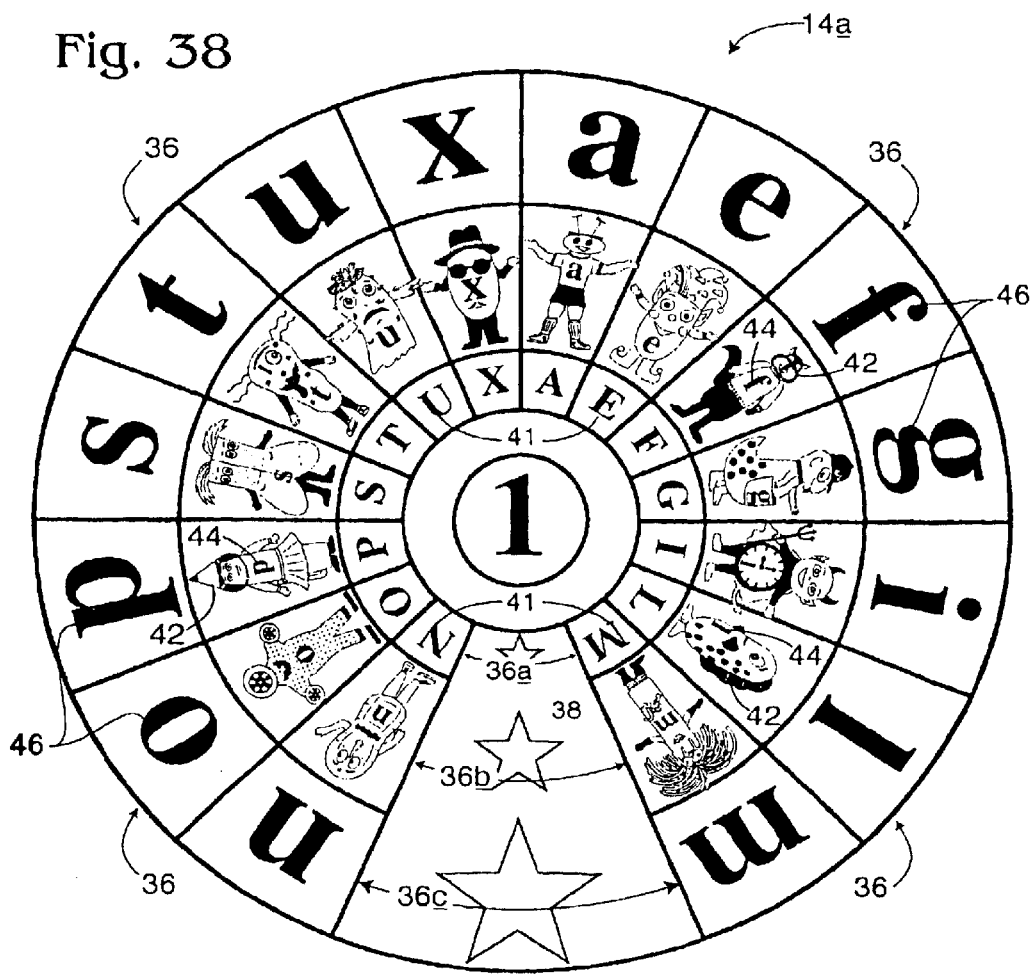
FIG. 38 is an alternative embodiment of Wheel 1, with capital letters instead of pronunciation symbols.

FIG. 26 shows a language learning system according to another embodiment of the invention generally at 110. System 110 typically includes an arrangement surface 112 on which a plurality of protrusions 114a–114g are formed.

These protrusions are also labeled 1–6, corresponding to the sets 1–6 of letters, characters, and pronunciation symbols found on Wheels 1–6. Typically cone-shaped selectors (such as 100a) with the letters, characters, and pronunciation symbols of the appropriate set 1–6 are placed thereon. A user may select desired cone-shaped selectors with appropriate symbols and arrange these cone-shaped selectors along the row of protrusions 116, to thereby form a word.

As shown in FIGS. 27–29, a language learning system is shown according to another embodiment of the invention generally at 120. System 120 includes cone-shaped selectors 100a–100g, which are similar to the cone-shaped selectors described above, but are provided with flat tops, such that they are stackable. The user may select desired letters, characters, and pronunciation symbols on each cone-shaped selector, and then stack the selectors in groups 124 to form words 122.

It will be understood that the various language learning devices described above may be used in conjunction with computerized learning device 24, shown in FIG. 2. The computerized learning device may be configured to connect to a global computer network to share information with other computerized learning devices. In addition, the blocks of FIGS. 10–12, vessels of FIGS. 13–14, cards of FIGS. 15 and 20, dolls of FIGS. 16–19, disks of FIGS. 21–23, and cones of FIGS. 24–29 may be equipped with position sensors linked via infrared or other link to computerized learning device 24. The computerized learning device may be configured to sense the position of the various articles and determine that the user has correctly (or incorrectly) spelled a word. The computerized learning device may also be equipped to respond in other ways as the user positions the blocks, vessels, cards, dolls, disks, cones, etc., for example, by offering suggestions or feedback to the user in graphical or audio form. The computerized learning device may also be configured with a timer or clock to track the user's time in spelling a word.

The above-described embodiments of the present invention enable a user to learn the pronunciation of a letter by associating it with the pronunciation of a name of a character, rather than learning the pronunciation of the letter by itself. This manner of learning is both enjoyable and effective, and may be used by both children and adults alike to assist in the acquisition of a new language.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

I claim:

1. A language learning system, comprising:
   a body;
   a plurality of phoneme selectors coupled to the body, each phoneme selector including a letter or letter combination, a character, and a pronunciation symbol separate from the letter or letter combination, the pronunciation symbol indicating a pronunciation for the letter or letter combination, all associated with a phoneme, the character having a name including the phoneme; and a target window positioned in the body, the target window being configured to display a target;

wherein the plurality of selectors are configured to be adjustable by a user to spell a name of the target;

wherein the letter or letter combination and pronunciation symbol are distinguished in that each letter or letter combination may have a plurality of possible pronunciations when used in different words, but each pronunciation symbol has only one possible pronunciation.

2. The language learning system of claim 1, wherein each selector is wheel-shaped.

3. The language learning system of claim 1, wherein the letters or letter combinations, characters, and pronunciation symbols are positioned in respective sectors of a plurality of character regions positioned on the selector.

4. The language learning system of claim 1, wherein the body further includes a selection pane through which a user may view a selected letter or letter combination on the phoneme selector.

5. The language learning system of claim 4, wherein the selection pane is adapted to enable a user to view at least one of a selected character, a selected pronunciation symbol and a selected letter or letter combination of the phoneme selector.

6. The language learning system of claim 1, wherein the plurality of phoneme selectors includes five phoneme selectors.

7. A language learning system, comprising:

a set of two or more sequenced selector substrates, each selector substrate including three or more character regions, each character region including indicia showing a unique character icon and a letter or letter combination from a name associated with the character icon, the character icon and letter or letter combination forming a graphical unit that represents a single pronunciation of the letter or letter combination as used in the character name, and that does not represent any other possible pronunciation of the letter or letter combination;

wherein the first selector substrate of the set of two or more sequenced selector substrates contains all letters or letter combinations necessary to spell each of the character names of the character icons on the first selector substrate, and wherein the graphical units formed by the character icons and letters or letter combinations on the first selector substrate indicate all pronunciations necessary to correctly pronounce each of the character names of the character icons on the first selector substrate; and wherein the first selector substrate of the set of two or more sequenced selector substrates may be sequentially combined with the other selector substrates of the set of two or more sequenced selector substrates so that the sequentially combined selector substrates contain all letters or letter combinations necessary to spell each of the character names of the character icons on the sequentially combined selector substrates, and wherein the graphical units formed by the character icons and letters or letter combinations on the sequentially combined selector substrates indicate all pronunciations necessary to correctly pronounce each of the character names of the character icons on the sequentially combined selector substrates.

8. The language learning system of claim 7, wherein each letter or letter combination that has only a single possible pronunciation is shown as indicia within a single character region on the selector substrates to be paired with a single, unique character icon; and wherein each letter or letter combination that has more than one possible pronunciation appears as indicia within a plurality of character regions on the selector substrates, in each character region the letter or letter combination being paired with a different character icon for each pronunciation;

such that each letter or letter combination paired with a unique character icon forms a graphical unit that represents a unique pronunciation of the letter or letter combination.

9. The language learning system of claim 7, wherein the selector substrates are adjustable to spell the name of a target.

10. The language learning system of claim 7, wherein the character icons and letter or letter combinations are removably attached to a body.

11. The language learning system of claim 7, wherein the character regions include indicia showing a pronunciation symbol separate from the letter or letter combination, the pronunciation symbol indicating a pronunciation for the letter or letter combination.

12. The language learning system of claim 7, wherein the selector substrates are coupled with a selection pane adapted to enable a user to view at least one of a selected character, a selected pronunciation symbol and a selected letter or letter combination of the selector substrate.

13. The language learning system of claim 7, wherein the selector substrates are attached to a body.

14. The language learning system of claim 13, wherein the selector substrates are adjustable to spell the name of a target.

15. The language learning system of claim 13, wherein the body includes a target window, the target window configured to display a target.

16. The language learning system of claim 13, wherein the body includes a selection pane adapted to enable a user to view at least one of a selected character, a selected pronunciation symbol, and a selected letter or letter combination of the selector substrates.

17. The language learning system of claim 13, wherein the selector substrates may be detached from the body to spell the name of a target.

* * * * *